(12) United States Patent
Amano et al.

(10) Patent No.: US 8,745,342 B2
(45) Date of Patent: Jun. 3, 2014

(54) COMPUTER SYSTEM FOR CONTROLLING BACKUPS USING WIDE AREA NETWORK

(75) Inventors: Takashi Amano, Yokohama (JP); Yoshiki Kano, Yokohama (JP); Yuichi Taguchi, Sagamihara (JP); Yoshimasa Masuoka, Kunitachi (JP)

(73) Assignee: Hitachi Ltd., Tokyo (JP)

( * ) Notice: Subject to any disclaimer, the term of this patent is extended or adjusted under 35 U.S.C. 154(b) by 295 days.

(21) Appl. No.: 12/664,810

(22) PCT Filed: Sep. 24, 2009

(86) PCT No.: PCT/JP2009/004827
§ 371 (c)(1),
(2), (4) Date: Jun. 24, 2011

(87) PCT Pub. No.: WO2011/036707
PCT Pub. Date: Mar. 31, 2011

(65) Prior Publication Data
US 2011/0246732 A1    Oct. 6, 2011

(51) Int. Cl.
*G06F 12/00* (2006.01)
(52) U.S. Cl.
USPC .............. 711/162; 711/E12.103; 709/228
(58) Field of Classification Search
None
See application file for complete search history.

(56) References Cited

U.S. PATENT DOCUMENTS

| | | | |
|---|---|---|---|
| 7,685,171 B1 * | 3/2010 | Beaverson et al. | 707/999.202 |
| 2001/0044879 A1 * | 11/2001 | Moulton et al. | 711/114 |
| 2004/0220971 A1 * | 11/2004 | Kaushik et al. | 707/200 |
| 2005/0060356 A1 * | 3/2005 | Saika | 707/204 |
| 2006/0129615 A1 | 6/2006 | Derk et al. | |
| 2010/0088150 A1 * | 4/2010 | Mazhar et al. | 705/10 |
| 2010/0131624 A1 * | 5/2010 | Ferris | 709/221 |
| 2011/0131335 A1 * | 6/2011 | Spaltro et al. | 709/228 |

FOREIGN PATENT DOCUMENTS

| | | |
|---|---|---|
| JP | 7-210430 | 8/1995 |
| JP | 7210430 | 8/1995 |

* cited by examiner

*Primary Examiner* — Reginald Bragdon
*Assistant Examiner* — Brendan Lillis
(74) *Attorney, Agent, or Firm* — Brundidge & Stanger, P.C.

(57) ABSTRACT

One of a backup apparatus and a storage system performs control to store backup data in a storage system which belongs to an organization and/or location different from an organization and/or location to which a storage-target storage system for original data belongs, based on information (P) and/or (Q) below: (P) information relating to original data, and information relating to backup data, which is a copy of the original data; (Q) information indicating an organization and/or location to which each storage system belongs.

2 Claims, 50 Drawing Sheets

| SaaS ID | Company Name | Storage Location | IP Address | Mount Point |
|---|---|---|---|---|
| 1 | SaaS-A | North America | 192.168.0.100 | D: |
| 2 | SaaS-B | Asia | 192.168.0.101 | O: |
| ... | ... | ... | ... | ... |
| 10 | SaaS-P | North America | 192.168.0.200 | W: |
| ... | ... | ... | ... | ... |

Server-A's SaaS Management Table

Fig.6

| Schedule ID | Schedule Name | Start Time |
|---|---|---|
| 1 | Backup-A | 22:00:00, Every Day |
| 2 | Backup-B | 10:00:00, Every Sunday |
| 3 | Backup-C | 1:00:00, Every Day |

Server-A's Schedule Management Table

Server-A's Backup Management Table (306)

| ID (800) | Backup Source (801) | Backup Target (802) | Schedule ID (700) |
|---|---|---|---|
| 1 | O:¥file1.txt | P:¥backup¥a¥ | 1 |
| 2 | O:¥file2.txt | P:¥backup¥a¥ | 1 |
| 3 | O:¥file3.txt | P:¥backup¥a¥ | 1 |
| 4 | O:¥file4.txt | P:¥backup¥a¥ | 1 |
| 5 | O:¥directory-A¥ | P:¥backup¥b¥ | 2 |
| 6 | O:¥ | Q:¥ | 3 |

| Local ID 900 | File Name 901 | UUID 902 | SaaS ID 600 |
|---|---|---|---|
| 1 | O:¥file1.txt | UUID01 | 1 |
| 2 | O:¥file2.txt | UUID02 | 2 |
| 3 | O:¥file3.txt | UUID03 | 3 |
| 4 | O:¥file4.txt | UUID04 | 1 |
| 5 | O:¥file5.txt | UUID05 | 1 |

Server-A's File Management Table 307

Fig.9

| Company Name | Storage Location | IP Address |
|---|---|---|
| PaaS-A | North America | 192.168.0.100 |

Server-B's Company Management Table

Fig.10

| Path Name | File Name | UUID | Extended UUID | WEBDAV Pointer | PaaS ID |
|---|---|---|---|---|---|
| O:¥ | file1.txt | UUID01 | UUIDX1+BUID | 2000 | - |
| O:¥ | file2.txt | UUID02 | UUIDX2+BUID | 2010 | - |
| O:¥ | file3.txt | UUID03 | UUIDX3+BUID | 2020 | - |
| O:¥ | file4.txt | UUID04 | UUIDX4+BUID | 2030 | 1 |
| O:¥ | file5.txt | UUID05 | UUIDX5+BUID | 2040 | 2 |

Server-B's File Management Table

Fig.11

| PaaS ID | Company Name | Storage Location | IP Address | Mount Point |
|---|---|---|---|---|
| 1 | PaaS-C | Asia | 192.168.0.205 | R:¥ |
| 2 | PaaS-D | North America | 192.168.0.206 | S:¥ |

Server-B's PaaS Management Table

Fig.12

| PaaS ID | Company Name | Storage Location | IP Address | Mount Point |
|---|---|---|---|---|
| 1 | PaaS-A | Asia | 192.168.0.200 | G:¥ |
| 2 | PaaS-D | North America | 192.168.0.210 | H:¥ |

Server-C's PaaS Management Table

Fig.13

| Company Name | Storage Location | IP Address |
|---|---|---|
| SaaS-A | North America | 192.168.0.100 |

Server-C's Company Management Table

Server-C's File Management Table

| Local ID 1500 | Path Name 1501 | File Name 1502 | UUID 1503 | Extended UUID 1504 | PaaS ID 1505 |
|---|---|---|---|---|---|
| 1 | N:¥file¥ | file1.txt | UUID01 | UUIDX1+BUID | 1 |
| 2 | N:¥file¥ | file2.txt | UUID02 | UUIDX2+BUID | 1 |
| 3 | N:¥file¥ | file3.txt | UUID03 | UUIDX3+BUID | 1 |
| 4 | N:¥file¥ | file4.txt | UUID04 | UUIDX4+BUID | 1 |
| 5 | N:¥file¥ | file5.txt | UUID05 | UUIDX5+BUID | 1 |
| 6 | M:¥file2¥ | file6.txt | UUID06 | UUIDX6+BUID | 2 |

504

```
PROPFIND  /file1.txt HTTP/1.1
Host: 192.168.0.100

<D:propfind xmlns:D="DAV:">
   <D:prop
xmlns:R="http://192.168.0.100/bakcup01/">
      <R:UUID/>
   </D:prop>
</D:propfind>
```

1600

UUID Request

Fig.16

```
HTTP/1.1 207 Multi-Status

<D:multistatus xmlns:D="DAV:">
  <D:response>

<D:href>http://192.168.0.100/backup/file1.txt</D:href>
  <D:propstat>
    <D:prop
xmlns:R="http://192.168.0.100/backup01/">
      <R:UUID>
        UUID01
      </R:UUID>
    </D:prop>
    <D:status>HTTP/1.1 200 OK</D:status>
  </D:propstat>
  </D:response>
</D:multistatus>
```

Response of UUID Request

Fig.17

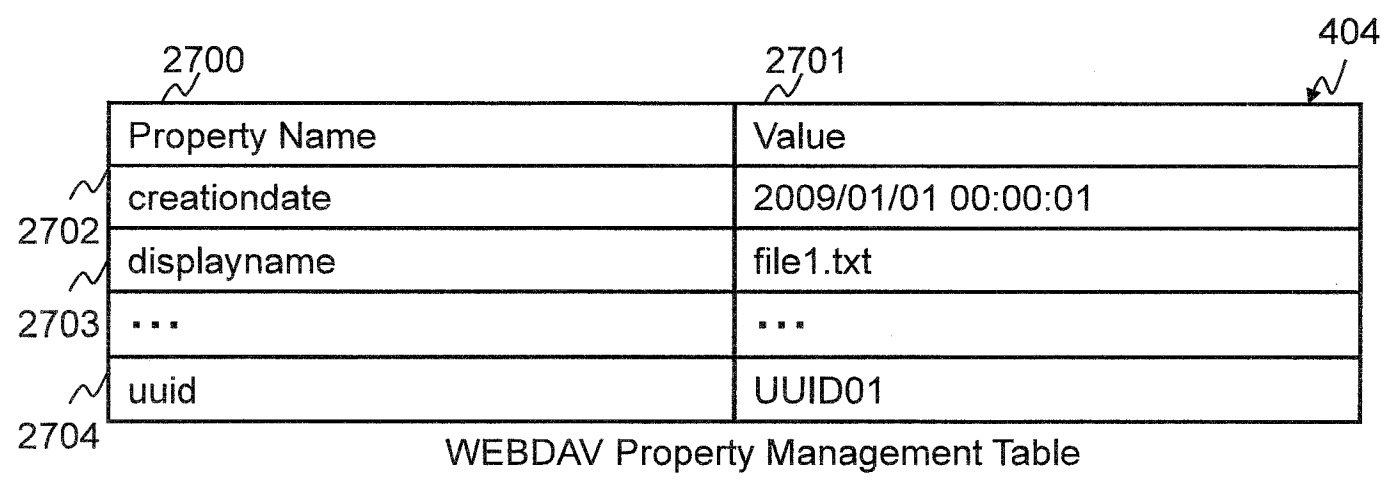

| Property Name | Value |
|---|---|
| creationdate | 2009/01/01 00:00:01 |
| displayname | file1.txt |
| ... | ... |
| uuid | UUID01 |

Fig.27

WEBDAV Property Management Table

IP 192.168.0.100
Name SaaS
Organization Hitachi
Location North America

Response of Request environment information

Fig.43

| Storage ID 4700 | IP Address 4701 | Storage Location 4702 | 4601 |
|---|---|---|
| 1 | 192.168.211.11 | North America |

Storage Management Table of Storage

Fig.47

| Storage ID | IP Address | Storage Location |
|---|---|---|
| 1 | 192.168.211.11 | North America |
| 2 | 192.168.211.12 | Asia |
| ... | ... | ... |
| 10 | 192.168.211.20 | North America |
| ... | ... | ... |

Node Management Table of Storage

Fig.48

| Local ID | Chunk ID | Path Name | File Name | Storage ID | Type | UUID | Extended UUID |
|---|---|---|---|---|---|---|---|
| 1 | 1 | *file* | file1.txt | 1 | Data | UUID01 | UUIDX1+BUID |
| 1 | 2 | *file* | file1.txt | 2 | Data | UUID01 | UUIDX1+BUID |
| 1 | 3 | *file* | file1.txt | 3 | Parity | UUID01 | UUIDX1+BUID |
| 2 | 1 | *file* | file2.txt | 3 | Data | UUID02 | UUIDX2+BUID |
| 2 | 2 | *file* | file2.txt | 4 | Data | UUID02 | UUIDX2+BUID |
| 2 | 3 | *file* | file2.txt | 5 | Parity | UUID02 | UUIDX2+BUID |

File Management Table of Storage

COMPUTER SYSTEM FOR CONTROLLING BACKUPS USING WIDE AREA NETWORK

TECHNICAL FIELD

The present invention generally relates to backups using a wide area network.

BACKGROUND ART

Technology of this type includes, for example, technology for sending backup data to any of a plurality of storage controllers from a backup apparatus that is coupled to a wide area network (the Internet, for example). For example, the backup apparatus disclosed in Patent Literature 1 determines a combination of a backup target file and a backup medium for storing the target file, on the basis of a description file describing file location and capacity of the backup target file, and a definition file describing the location and capacity of the backup medium, and stores the target file in the backup medium paired with the target file.

CITATION LIST

Patent Literature

[PTL 1]
Japanese Patent Application Laid-open No. H7-210430.

SUMMARY OF INVENTION

Technical Problem

Furthermore, in the case of backups using a wide area network, an online storage system provided by a PaaS (Platform as a Service) vendor, for example, is adopted as a system for storing backup data. PaaS vendors include, for example, Amazon, which provides the Amazon Simple Storage Service (Amazon S3).

Storing original data and backup data (a copy of the original data) in an online storage system provided by the same PaaS vendor is undesirable. This is because, should a problem arise with the PaaS vendor (the PaaS vendor files for bankruptcy, for example), both the original data and the backup data will likely be unusable.

Furthermore, storage of the original data and backup data in an online storage system in the same location is undesirable. This is because, should a disaster occur at this location, both the original data and the backup data would likely be lost.

Hence, an object of the present invention is to enable a user to use one of the original data and the backup data, even if a problem should arise with the organization and/or if a disaster should occur at its location.

Solution to Problem

One of a backup apparatus and a storage system which are coupled to a wide area network performs control to store backup data in a storage system (hereinafter 'second storage system') which belongs to an organization and/or location different from an organization and/or location to which a storage-target storage system for original data (hereinafter 'first storage system') belongs, based on information (P) and/or (Q) below:
(P) information relating to the original data, and information relating to backup data;
(Q) information indicating a organization and/or location to which each storage system belongs.

More specifically, for example, the storage system may comprise a communication interface for performing communications via a wide area network, a storage apparatus, and a controller coupled to the communication interface and the storage apparatus. In this case, the controller performs control to store backup data in the second storage system which belongs to an organization and/or location different from an organization and/or location to which the first storage system belongs, based on the (P) and/or (Q) information. The controller may also include a CPU and memory. In this case, the CPU is able to perform the aforementioned processing by executing a program that is read from the memory. The program may be a program acquired from a program source (a portable storage medium such as a CD-ROM, or a remote server, for example). The controller may include a hardware circuit instead of or in addition to the CPU and memory. Furthermore, the so-called 'storage apparatus' may be a storage apparatus 223 described in the subsequent embodiment, or a physical storage device (a hard disk or flash memory, for example).

Furthermore, for example, the backup apparatus may comprise a communication interface for performing communications via the wide area network, a storage apparatus, and a controller coupled to the communication interface and the storage apparatus. In this case, the controller performs control to store backup data in a second storage system which belongs to an organization and/or location different from an organization and/or location to which the first storage system belongs, based on the (P) and/or (Q) information. The controller may include a CPU and a memory, or may include a hardware circuit instead of or in addition to the CPU and memory.

Note that the control to store backup data in the second storage system may involve storing the backup data in the second storage system, or presenting the second storage system to the user as a backup-data data storage target.

Furthermore, the backup data may be a backup data copy, in which case the backup data constituting the source of the backup data may be the original data.

Furthermore, the 'location' may be a country unit, for example, or a smaller unit than a country (a state, ward, or city, for example).

Advantageous Effects of Invention

The present invention enables the user to use one of the original data and the backup data even if a problem should arise with the organization and/or if a disaster should occur at its location.

BRIEF DESCRIPTION OF DRAWINGS

FIG. 6 shows an example of a SaaS management table 304 in a user server, according to the first embodiment of the present invention.

FIG. 7 shows an example of a schedule management table 305 in a user server, according to the first embodiment of the present invention.

FIG. 8 shows an example of a backup management table 306 in a user server, according to the first embodiment of the present invention.

FIG. 9 shows an example of a file management table 307 in a user server, according to the first embodiment of the present invention.

FIG. 10 shows an example of an organization management table 401 in a PaaS server, according to the first embodiment of the present invention.

FIG. 11 is an explanatory diagram showing an example of a file management table 402 in a PaaS server, according to the first embodiment of the present invention.

FIG. 12 shows an example of a PaaS management table 403 in a PaaS server, according to the first embodiment of the present invention.

FIG. 13 shows an example of a PaaS management table 502 in a SaaS server, according to the first embodiment of the present invention.

FIG. 14 shows an example of an organization management table 503 in a SaaS server, according to the first embodiment of the present invention.

FIG. 15 shows an example of a file management table 504 in a SaaS server, according to the first embodiment of the present invention.

FIG. 16 shows an example of an API specification of a UUID request, according to the first embodiment of the present invention.

FIG. 17 shows an example of an API specification of a response to a UUID request, according to the first embodiment of the present invention.

FIG. 27 shows an example of a WEBDAV property management table, according to the first embodiment of the present invention.

FIG. 43 shows an example of API return values provided by the PaaS server and SaaS server, according to the third embodiment of the present invention.

FIG. 47 shows an example of a storage management table 4601 of a RAIN configuration, according to the fourth embodiment of the present invention.

FIG. 48 shows an example of a node management table 4602 of a RAIN configuration, according to the fourth embodiment of the present invention.

FIG. 49 shows an example of a file management table 4603 of a RAIN configuration, according to the fourth embodiment of the present invention.

DESCRIPTION OF EMBODIMENTS

In all of the following embodiments, it is assumed that storage systems are provided by PaaS vendors, and that SaaS (Software as a Service) vendors who use the PaaS vendors are present. A SaaS vendor uses an online storage system of a PaaS vendor and provides online storage, which is a data storage region, by assigning to it a new value for the software. An example of a SaaS vendor is Dropbox, which uses Amazon S3, and allows data to be easily stored in an online storage system using software.

Suppose that SaaS vendors typically use highly reliable, low-cost PaaS vendors. A situation may therefore arise where a plurality of SaaS vendors use the same PaaS vendor. Hence, even though a user of a backup apparatus may employ, as a storage target for backup data, a second SaaS vendor different from a first SaaS vendor and used as a storage target for original data, backup data will likely be stored in a storage system of a PaaS vendor belonging to the same organization and/or location as the storage system storing the original data.

When first and second SaaS vendors use a PaaS vendor belonging to the same location and a large-scale disaster occurs at this location, resulting in damage involving data loss at the PaaS vendor, both the original data and the backup data will be lost.

Furthermore, in a case where the first and second SaaS vendors use a PaaS vendor belonging to the same organization and the PaaS vendor goes bankrupt, the user will likely no longer be able to use both the original data and the backup data.

The computer system of the embodiments hereinbelow makes it possible to avoid storing backup data in the storage system provided by a PaaS vendor that belongs to the same organization and/or location as the organization and/or location of a PaaS vendor providing a storage system where the original data is stored. Consequently, even if the PaaS vendor goes bankrupt or a disaster befalls the location to which a plurality of PaaS vendors belong, the user is able to use one of the original data and backup data.

Several embodiments of the present invention will be described hereinbelow with reference to the drawings. Note that, in the following description, when the subject of processing is a program, the processing is actually executed by a processor that runs the program.

Embodiment 1

In the first embodiment, by using a UUID (Universally Unique Identifier) of a file saved in a storage system at a PaaS site, it is possible to avoid storing a backup file (copy of an original file) in the same storage system as a storage system where the original file is stored. 'Access' hereinbelow refers to processing for both data reading and data writing if not otherwise specified.

Figure 2:
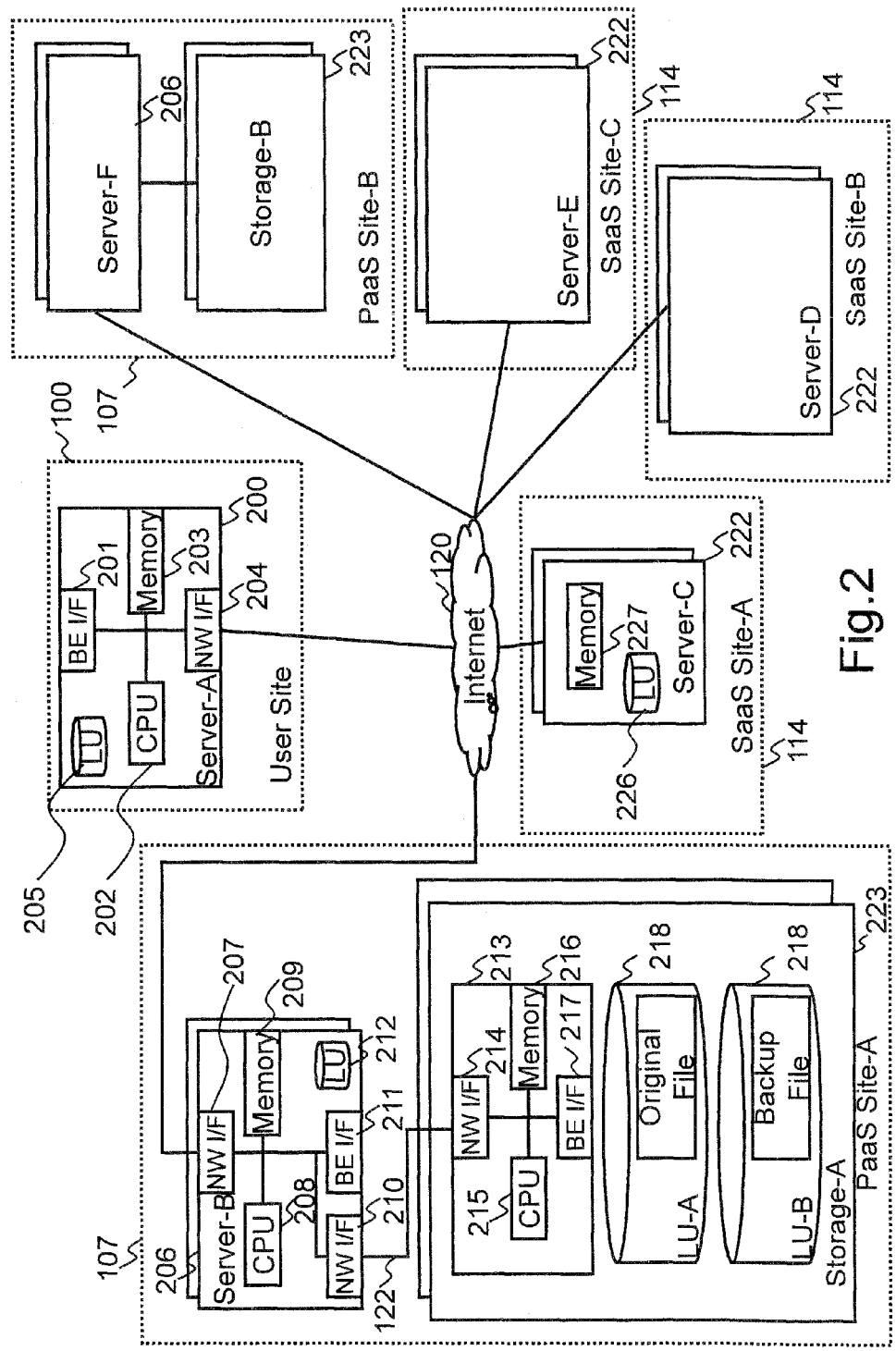
FIG. 2 shows an example of the composition of a computer system according to a first embodiment of the present invention.

FIG. 2 shows an example of the composition of the computer system according to the first embodiment of the present invention.

The computer system comprises a user site 100, a SaaS site 114, and a PaaS site 107. Each site is coupled to the Internet 120. FIG. 2 shows three SaaS sites A, B, and C, but the number of SaaS sites 114 may be a number higher or lower than three. Furthermore, FIG. 2 shows two PaaS sites A and B, but the number of PaaS sites 107 may be a number greater than two. When referring to any of the three SaaS sites, or either of the two PaaS sites hereinbelow, alphabetic characters will be assigned to the SaaS sites and PaaS sites.

The user site 100 has a server (hereinafter 'user server') 200. The user server 200 is an example of a backup apparatus. The user server 200 generates original files by executing an application program 303 (refer to FIG. 3). The user server 200 also performs backups of the original files.

The SaaS sites 114 have a SaaS vendor server (hereinafter 'SaaS server') 222. The SaaS server 222 supplies an online storage system, provided by the PaaS vendor, to the user server 200.

The online storage system of the PaaS vendor is at the PaaS site 107. The online storage system stores original files and/or backup files. The online storage system includes a server (hereinafter, 'PaaS server') 206, and a storage apparatus 223 coupled to the PaaS server 206.

Each of the components of the computer system will be described hereinbelow.

The user server 200 comprises a backend interface 201, a CPU (Central Processing Unit) 202, a memory (main memory, for example) 203, and a network interface 204. The CPU 202 manages a logical unit (hereinafter 'LU') 205.

The backend interface 201 is a device allowing the CPU 202 to access a physical storage device (hard disk or flash memory, for example) that holds the LU 205.

The CPU 202 executes programs stored in the memory 203.

The memory 203 stores programs and information (tables, for example).

The network interface 204 is a device for Ethernet (trademark) communications with the SaaS server 222.

The LU 205 stores programs (not shown). When the user server 200 starts up, programs are read by the CPU 202 from the LU 205 to the memory 203. The LU 205 may be a logical storage device that is supplied, using RAID (Redundant Arrays of Inexpensive Disks) technology, from a plurality of physical storage devices, for example. Furthermore, one or more physical storage devices may be adopted instead of the LU 205. The same is also true for LU 212 and LU 218, described subsequently.

Furthermore, the controller is provided by the CPU 202 and the memory 203. However, instead of or in addition to programs being executed by a processor such as the CPU 202, the controller may be implemented by hardware. The same is also true for at least one of the PaaS server 206, the SaaS server 222, and a storage controller 213, which is described subsequently.

The PaaS server 206 includes a backend interface 211, a CPU 208, a memory 209, a network interface 207, and a network interface 210. The LU 212 is managed by the CPU 208.

The backend interface 211 is a device allowing the CPU 208 to access the LU 212.

The CPU 208 executes programs stored in the memory 209.

The memory 209 stores programs and information (tables, for example).

The network interface 207 is a device for communicating with a SaaS server 222 via the Ethernet, for example.

Although not shown in figures, programs are stored in the LU 212. When the PaaS server 206 starts up, programs are read from the LU 212 to the memory 209 by the CPU 208.

The network interface 210 is a device coupled to the storage apparatus 223 via a fibre channel cable 122, for example.

The storage apparatus 223 comprises a storage controller 213, and one or more physical storage devices (hard disks, for example) upon which LU 218 are based. FIG. 2 shows two LU 218, but the number of LU 218 may be a number higher or lower than two. When either of the two LU is referred to hereinbelow, alphabetic characters will be assigned to the LU.

The storage controller 213 comprises a network interface 214, a CPU 215, a memory 216, and a backend interface 217.

The network interface 214 is a device coupled to the PaaS server 206 via the fibre channel cable 122, for example.

The CPU 215 executes a program (not shown; hereinafter 'access control program') which is stored in the memory 216 and controls access to the LU 218 from the PaaS server 206, for example.

The memory 216 is a memory used as a cache for data constituting the files storing the access control program.

A plurality of physical storage devices supporting the plurality of LU 218, for example, are coupled to the backend interface 217. As a result, the CPU 208 is able to access the LU 212.

The SaaS server 222 has the same composition as the user server 200, except that the programs stored in the LU 226 and memory 227 differ from the programs stored in the LU 205 and the memory 203, and the information (tables, for example) stored in the memory 227 differs from the information (tables, for example) stored in the memory 203. Details will be provided subsequently.

Figure 3:
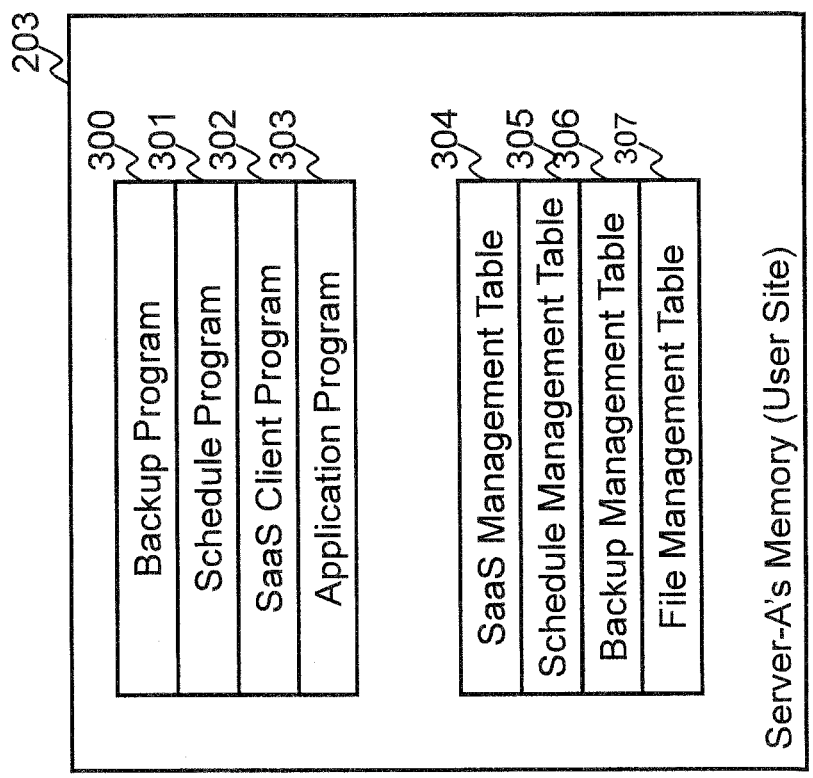
FIG. 3 shows an example of programs and information stored in a memory 203 in a user server, according to the first embodiment of the present invention.

FIG. 3 shows programs and information stored in the memory 203 in the user server 200.

The memory 203 stores a backup program 300, a schedule program 301, a SaaS client program 302, an application program 303, a SaaS management table 304, a schedule management table 305, a backup management table 306, and a file management table 307. The information may also be stored in a format other than table format.

The backup program 300 is a program for backing up original files designated by the user.

The schedule program 301 is a program for executing the backup program 300 according to a schedule configured by the user.

The SaaS client program 302 is a program for accessing online storage provided by the SaaS server program 500, from the backup program 300 and the application program 303.

The application program 303 is a program that executes the work of a user and generates original files. The original files generated by the application program 303 are stored in the storage apparatus 223 of the PaaS sites 107 via the SaaS sites 114.

The SaaS management table 304 is a table that includes information relating to the SaaS site 114, which is the storage target for the original file written by the application program 303, and information relating to the SaaS sites 114, which are storage-target candidates for the backup file written by the backup program 300.

The schedule management table 305 is a table that includes information relating to schedules according to which the schedule program 301 runs the backup program 300.

The backup management table 306 is a table that includes information relating to backup files and information relating to online storage serving as the backup target.

The file management table 307 is a table that includes information relating to all the files created by the application program 303 or the backup program 300.

Figure 4:
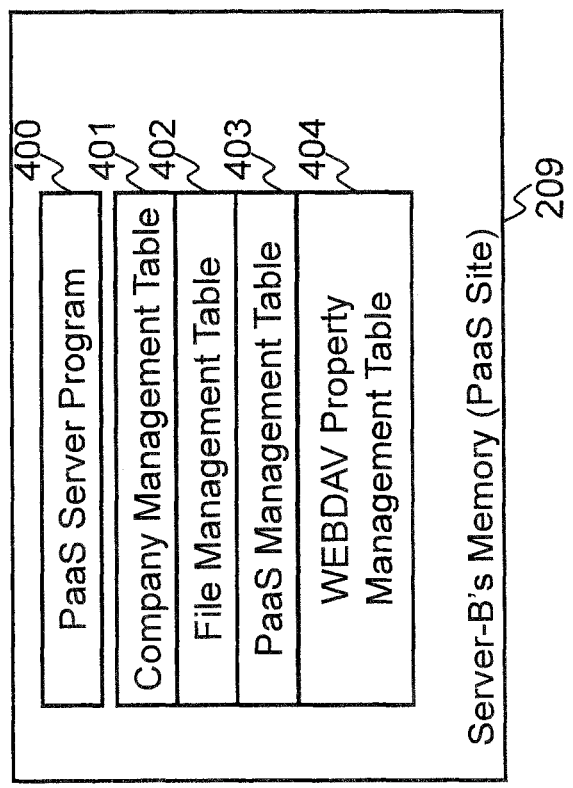
FIG. 4 shows an example of a program and information stored in a memory 209 in a PaaS server, according to the first embodiment of the present invention.

FIG. 4 shows a program and information stored in the memory 209 in the PaaS server 206.

The memory 209 stores a PaaS server program 400, an organization management table 401, a file management table 402, a PaaS management table 403, and a WEBDAV (Web-based Distributed Authoring and Versioning) property management table 404.

A PaaS server program 400 is a program providing a function for saving files in the storage apparatus 223 via the Internet 120, a function for deleting files from the storage apparatus 223, and a function for reading files from the storage apparatus 223.

The organization management table 401 is a table that includes information relating to the organizations of the SaaS vendor.

The file management table 402 is a table that includes information (including UUIDs) relating to all the files that the PaaS server program 400 has saved in the storage apparatus 223.

The PaaS management table 403 is a table that includes information relating to the PaaS sites 107 serving as backup file storage target candidates when a file is judged by the PaaS server program 400 to be a backup file.

The WEBDAV property management table 404 is a table that includes information relating to WEBDAV properties.

Figure 5:
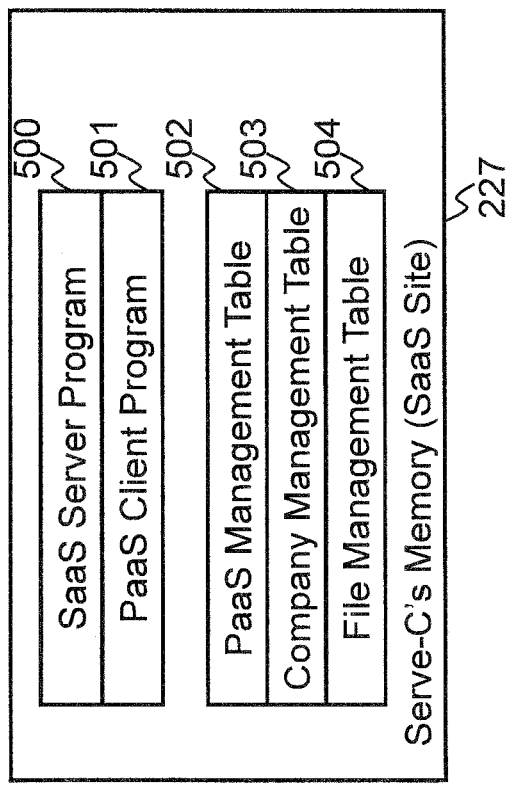
FIG. 5 shows an example of programs and information stored in a memory 227 in a SaaS server, according to the first embodiment of the present invention.

FIG. 5 shows programs and information stored in the memory 227 in the SaaS server 222.

The memory 227 stores the SaaS server program 500, the PaaS client program 501, the PaaS management table 502, the organization management table 503, and the file management table 504.

The SaaS server program 500 is a program that provides a function for saving files in online storage provided by the PaaS sites 107 via the Internet 120, a function for deleting files from the online storage, and a function for reading files from the online storage.

The PaaS client program 501 is a program for accessing the online storage provided by the PaaS server program 400 from the SaaS server program 500.

The PaaS management table 502 is a table that includes information relating to PaaS sites 107 serving as file storage target candidates when the PaaS server program 400 returns an error, in saving a file, in response to a file save request from the SaaS server program 500.

The organization management table 503 is a table that includes information relating to the organizations of the PaaS vendor.

The file management table 504 is a table that includes information relating to all files saved in the PaaS sites 107 by the SaaS server program 500.

The detailed processing of each of the above programs will be described subsequently using flowcharts. Details on the various management tables will be provided subsequently.

FIG. 6 shows an example of the SaaS management table 304 in the user server 200.

The SaaS management table 304 includes a SaaS ID 600, an organization name 601, a storage location 602, and an IP address 603 for each of the SaaS sites 114 managed by the user server 200.

The SaaS ID 600 is an ID for identifying a SaaS site 114.

The organization name 601 is a name of a vendor operating a SaaS site.

The storage location 602 is the location of the last storage apparatus 223 where the SaaS vendor saved a file. This table item is used in a third embodiment.

The IP address 603 is the IP address for accessing the SaaS server 222 (typically the IP address of the SaaS server 222).

The mount point 604 is the name of the drive where the online storage supplied by the SaaS vendor is mounted in the SaaS server 222.

The organization name 601 and the IP address 603 are registered in the SaaS management table 304 by being input by the administrator of the user site 100 (hereinafter 'user administrator') via a SaaS site registration screen (not shown)

that is provided by the backup program 300, using a management terminal (not shown, referred to hereinafter as 'user management terminal') at the user site 100, for example. The SaaS ID 600 is generated by the backup program 300 when a pairing of the organization name 601 and the IP address 603 is registered, and the SaaS ID 600 is registered in the SaaS management table 304 in association with this pairing, for example. In cases where the SaaS site 114 used is known beforehand, the user administrator configures a mount point by using the file system of the PaaS server 206, before using the application program 303 and the backup program 300, for example. The mount point 604 is registered in the SaaS management table 304 by the backup program 300 at this time, for example.

FIG. 7 shows an example of the schedule management table 305 in the user server 200.

The schedule management table 305 includes, for each backup schedule, a schedule ID 700, a schedule name 701, and a start time 702.

The schedule ID 700 is an ID for identifying the backup schedules.

The schedule name 701 is the name of a schedule.

The start time 702 is the time when the backup is started. The schedule program 301 runs the backup program 300 when the start time 702 is reached. The start time 702 may indicate the date, time, day, or period when the backup is executed, for example.

The schedule name 701 and the start time 702 are registered in the schedule management table 305 by being input by the user administrator via the schedule registration screen (not shown) provided by the schedule program 301, using the user management terminal, for example. The schedule ID 700 is generated by the schedule program 301 when a pairing of the schedule name 701 and the start time 702 is registered, for example, the schedule ID 700 being registered in the schedule management table 305 in association with this pairing.

FIG. 8 shows an example of the backup management table 306 in the user server 200.

The backup management table 306 includes an ID 800, a backup source 801, a backup target 802, and a schedule ID 700, for each backup set. A backup set is a combination of a backup source, a backup target, and a backup schedule.

The ID 800 is an ID for identifying combinations of the backup source 801, the backup target 802, and the schedule ID 700.

The backup source 801 is information indicating the file, directory, or drive backed up by the backup program 300.

The backup target 802 is information indicating a target directory or drive in which the data of the backup source 801 is saved by backup processing (the initial value of the directory or drive, for example).

The backup source 801, the backup target 802, and the schedule ID 700 are registered in the backup management table 306 by being input by the user administrator via a backup registration screen (not shown) provided by the backup program 301, using the user management terminal, for example. The backup ID 800 is generated by the backup program 300 when a combination of the backup source 801, the backup target 802, and the schedule ID 700 are registered, for example, the backup ID 800 being registered in the backup management table 306 in association with this combination.

FIG. 9 shows an example of the file management table 307 in the user server 200.

The file management table 307 includes, for each file, a local ID 900, a file name 901, a UUID 902, and the SaaS ID 600. The local ID 900 is an ID uniquely identifying a file.

The file name 901 is the name of a file. The file name 901 includes a path name, for example.

The UUID 902 is a unique ID that is allocated to a file by a file system (not shown) when the file is saved in the storage apparatus 223 of the PaaS site 107.

The file name 901 is registered by the file system when the application program 303 or the backup program 300 creates a file, for example. The UUID 902 is registered after being acquired from a PaaS site when a backup is performed by the backup program 300. This will be described in detail subsequently using FIG. 26. A SaaS ID 600 is registered by the file system when a file is created, for example, by using the SaaS management table 304 to specify the SaaS ID 600 from the file name 901 and the mount point 604.

FIG. 10 shows an example of the organization management table 401 in the PaaS server 206.

The organization management table 401 includes an organization name 1000, a storage location 1001, and an IP address 1002.

The organization name 1001 is the name of the vendor (PaaS vendor) operating the PaaS site with the PaaS server 206 in which the organization management table 401 is stored.

The storage location 1001 is the location of the last storage apparatus 223 in which the PaaS vendor saved the file. This table item is used in the third embodiment.

The IP address 1002 is an IP address for accessing the PaaS server 206 storing the organization management table 401.

The organization name 1000 and the IP address 1002 are registered in the organization management table 401 by being input by the administrator of the PaaS site 107 (hereinafter 'PaaS administrator') via an organization registration screen (not shown) provided by the PaaS server program 400, using a management terminal (not shown, hereinafter 'PaaS management terminal') in the PaaS site 107.

FIG. 11 shows an example of the file management table 402 in PaaS server 206.

The file management table 402 includes, for each file, a path name 1100, a file name 1101, a UUID 1102, an extended UUID 1103, and a WEBDAV pointer 1104.

The path name 1100 is the name of the drive and the name of the directory where the file is stored.

The file name 1101 is the name of the file.

The UUID 1102 is a unique ID allocated to the file by the file system when the file is saved in the storage apparatus 223.

The extended UUID 1103 is an ID based on the UUID of the file, created during a file backup by the backup program 300. The extended UUID includes the UUID of the backup source file and a backup identifier identifying the file as a backup file, for example.

The WEBDAV pointer 1104 is a pointer where WEBDAV properties are stored.

A PaaS ID 1105 is registered by the file system when a file is created, for example, by using the PaaS management table 403 to specify a PaaS ID 1505 (see FIG. 15) from the path name 1100, the file name 1101, and the mount point 1204. When another PaaS site is not being used, a value (a hyphen, for example) signifying that another PaaS site is not used is registered as the PaaS ID 1105, for example. The path name 1100, the file name 1101, the UUID 1102, and the WEBDAV pointer 1104 are indicated to the file system by the PaaS server program 400 when a file is created, for example, and registered. The extended UUID 1103 is registered by the PaaS server program 400, which receives the extended UUID 1103 sent from the backup program 300, when a backed-up file is saved in the storage apparatus 223, for example. In cases where files written from a plurality of SaaS sites 114 or Paas sites 107 are managed, although not illustrated, this can be implemented by registering a user ID, which corresponds to each written file, in the file management table 402. When communication with the PaaS site 107 starts, authentication is performed using the user ID of the SaaS site 114 or PaaS site 107 that issued a communication start request, and file association is performed using the user ID.

FIG. 12 shows an example of the PaaS management table 403 in the PaaS server 206.

The PaaS management table 403 includes, for each PaaS site managed by the PaaS server 206, a PaaS ID 1200, an organization name 1201, a storage location 1202, and an IP address 1203.

PaaS ID 1200 is an ID for identifying a combination of the organization name 1201, the storage location 1202, and the IP address 1203 (of another PaaS site).

The organization name 1201 is the name of the vendor of another PaaS site (hereinafter 'other PaaS site 107') from the PaaS site 107 (hereinafter 'own PaaS site 107') where the PaaS management table 403 is stored. The other PaaS site 107 is a PaaS site that is used as another storage target PaaS site 107 when a file, owing to its identical UUID 1102, is not saved in the storage apparatus 223 of the own PaaS site 107.

The storage location 1202 is the location of the last storage apparatus 223 where the PaaS vendor saved the file. This table item is used in the third embodiment.

The IP address 1203 is an IP address for accessing the server 206 of the other PaaS site 107.

The mount point 1204 is the name of the drive where the online storage provided by the PaaS vendor is mounted on the server 206.

The organization name 1201 and the IP address 1203 are registered in the PaaS management table 403 by being input by the PaaS administrator via a PaaS site registration screen (not shown) provided by the PaaS server program 400, using the PaaS management terminal, for example. In cases where the PaaS site 107 used is known beforehand, the PaaS administrator configures a mount point by using the file system of the PaaS server 206, for example. The mount point 1204 is registered in the PaaS management table 403 by the file system at this time, for example.

FIG. 13 shows an example of the PaaS management table 502 in the SaaS server 222.

The PaaS management table 502 includes, for each PaaS site 107 managed by the SaaS server 222, a PaaS ID 1300, an organization name 1301, a storage location 1302, an IP address 1303, and a mount point 1304.

The PaaS ID 1300 is an ID for uniquely identifying a combination of the organization name 1301, the storage location 1302, the IP address 1303, and the mount point 1304 (of a PaaS site).

The organization name 1301 is the name of the vendor (PaaS vendor) operating the PaaS site.

The storage location 1302 is the location of the last storage apparatus 223 where the PaaS vendor saved the file. This table item is used in the third embodiment.

The IP address 1303 is the IP address for accessing the server 206 of the PaaS site 107.

The mount point 1304 is the name of the drive where the online storage provided by the PaaS vendor is mounted on the server 222.

The organization name 1301 and the IP address 1303 serving as the connection target of the registered PaaS site 107 are registered in the PaaS management table 502 by being input by the SaaS site administrator (hereinafter 'SaaS administrator') via a PaaS site registration screen (not shown) provided by the SaaS server program 500, by using a management terminal at the SaaS site 114 (not shown, hereinafter the 'SaaS management terminal'), for example. The PaaS ID 1300 is generated by the SaaS server program 500 when a pairing of the organization name 1301 and the IP address 1303 is registered, for example, and registered in the PaaS management table 502 in association with this pairing. When the PaaS site 107 used is known beforehand, the SaaS administrator configures a mount point by using the file system of the server 222 before using the SaaS server program 500, for example. The mount point 1304 is registered in the PaaS management table 502 by the SaaS server program 500 at this time, for example.

Figure 14:
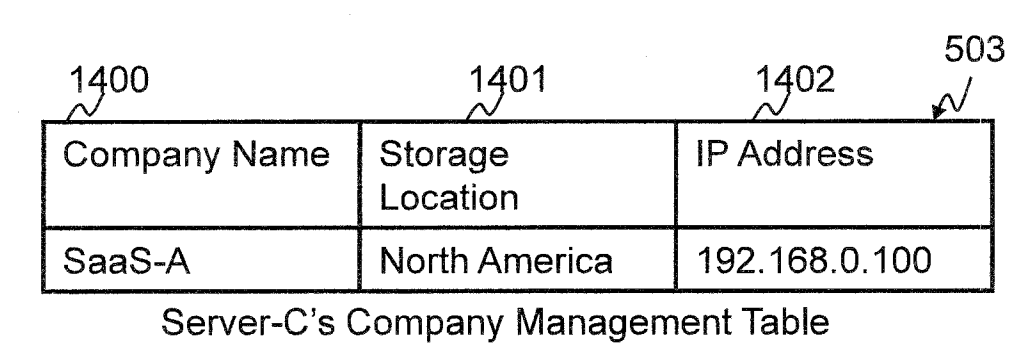

FIG. 14 shows an example of the organization management table 503 in the SaaS site server 222.

The organization management table 503 is composed by an organization name 1400, a storage location 1401, and an IP address 1402.

The organization name 1400 is the name of the vendor (SaaS vendor) operating the SaaS site which stores the organization management table 503.

The storage location 1401 is the location of the last storage apparatus 223 where the SaaS vendor saves the file. This table item is used in the third embodiment.

The IP address 1402 is an IP address for accessing the server 222 of the SaaS site 114 storing the organization management table 503.

The organization name 1000 and the IP address 1002 are registered in the organization management table 503 by being input by a SaaS administrator via an organization registration screen (not shown) provided by the SaaS server program 500, by using the SaaS management terminal, for example.

FIG. 15 shows an example of the file management table 504 in the SaaS server 222.

The file management table 504 includes, for each file, a local ID 1500, a path name 1501, a file name 1502, a UUID 1503, an extended UUID 1504, and a PaaS ID 1505.

The local ID 1500 is an ID whereby the SaaS server program 500 uniquely identifies a file.

The path name 1501 is the name of the drive and the name of the directory where the file is stored.

The file name 1502 is the name of the file.

The UUID 1503 is a unique ID that is allocated to the file by the file system when the file is saved in the storage apparatus 223 of the PaaS site 107.

The extended UUID 1504 is a UUID-based ID created when the file is backed up by the backup program 300.

The local ID 1500, the path name 1501, the file name 1502, and the PaaS ID 1505 are registered by the SaaS server program 500 when a file is created, for example. The UUID 1503 is registered by the SaaS server program 500 when a response to a UUID request of the backup program 300 is received by the SaaS server program 500 from the PaaS server program 400, for example. The extended UUID 1504 is registered by the SaaS server program 500 when the SaaS server program 500 receives the extended UUID from the backup program 300, for example. The PaaS ID 1505 is registered by the file system when a file is created, for example, by using the PaaS management table 502 to specify the PaaS ID 1505 from the path name 1501, the file name 1502, and the mount point 1304. When the PaaS site 114 used is known beforehand, the SaaS administrator configures a mount point by using the file system of the server 222 before using the SaaS server program 500, for example. The mount point 604 is registered in the file management table 504 by the SaaS server program 500 at this time, for example. In cases where files written from a plurality of user sites 100 are managed, although not illustrated, this can be implemented by registering a user ID, which corresponds to each written file, in the file management table 504. When communication with the SaaS site 114 starts, authentication is performed using the user ID of the user site 100 that issued a communication start request, and file association is performed using the user ID.

FIG. 16 shows an example of an API (Application Program Interface) specification of the UUID request.

In this embodiment, the WEBDAV standard, as defined under RFC 4918, for example, is extended so that UUIDs can be acquired from the PaaS server 206. A UUID item is added as a file property.

As shown in FIG. 16, the backup program 300 sends a file UUID request 1600 to the SaaS server 222 in XML (eXtensible Markup Language) format, for example, by using the WEBDAV PROPFIND method. The SaaS server 222 sends the UUID request 1600 to the PaaS server 206.

FIG. 17 shows an example of an API specification of a response to a UUID request.

After receiving the UUID request 1600, the PaaS server 222 sends a UUID, which is a Multi-Status file property, to the SaaS server 222 in XML format as a response 1700, as shown in FIG. 17. The SaaS server 222 sends a response 1700 to the user site 100 that issued the request.

Figure 18:
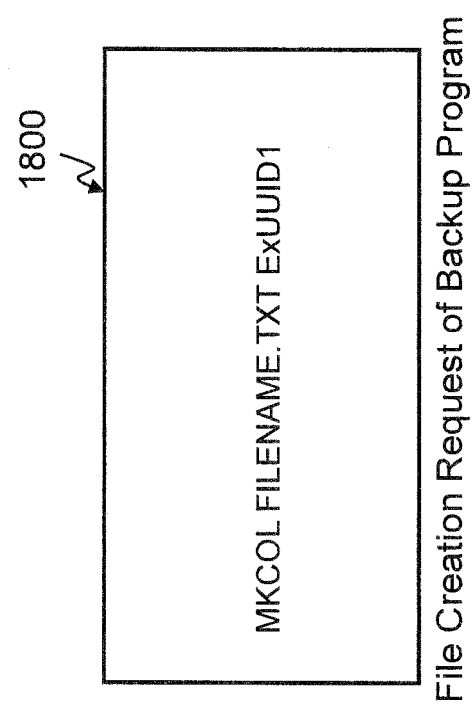
FIG. 18 shows an example of an API specification of a file creation request, according to the first embodiment of the present invention.

FIG. 18 shows an example of an API specification of a file creation request.

A file creation request 1800 is used by extending the MKCOL method of the WEBDAV standard, for example. The file name thus created is designated as a first parameter of the MKCOL method, and the extended UUID is designated as the second parameter thereof.

The backup program 300 uses the MKCOL method, for example, when the file creation request 1800 is sent to the SaaS site 114 for backup processing.

Figure 19:
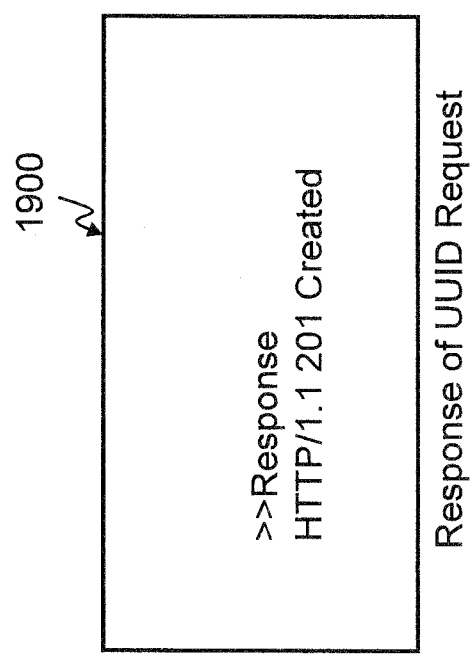
FIG. 19 shows an example of an API specification of a response to a file creation request, according to the first embodiment of the present invention.

FIG. 19 shows an example of an API specification of a response 1900 to a file creation request.

After receiving the file creation request 1800, the PaaS server 206 sends "Created" in FIG. 19 to the request source as a response 1900, for example.

Figure 20:
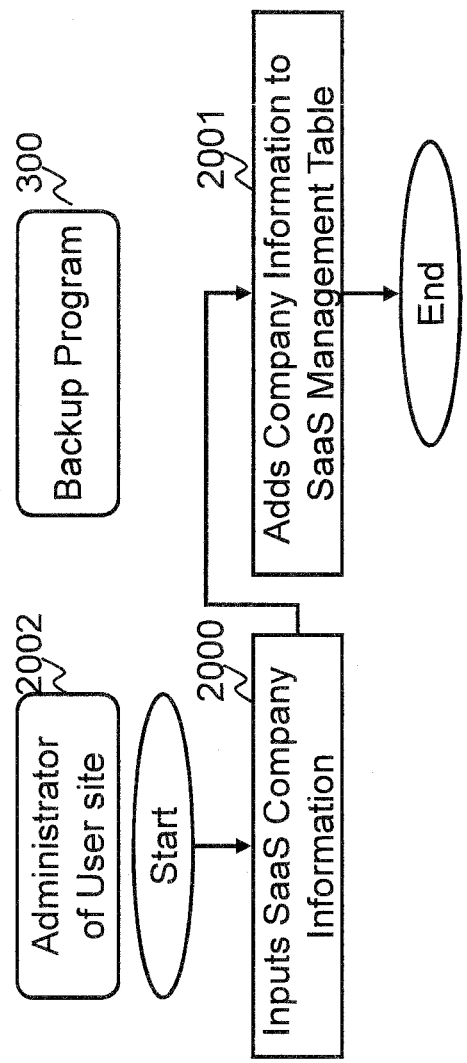
FIG. 20 is a flowchart of SaaS site registration processing of a user site, according to the first embodiment of the present invention.

FIG. 20 is a flowchart of SaaS site registration processing at the user site 100.

SaaS site registration processing at the user site 100 is executed as initial processing by a user administrator 2002, before the file creation processing by the application program 303 and the backup program 300 is executed.

The user administrator 2002 activates the SaaS registration screen of the backup program 300, and inputs the organization name and IP address of the SaaS site (step 2000).

The backup program 300 registers the information input in the SaaS management table 304 (step 2001).

Figure 21:
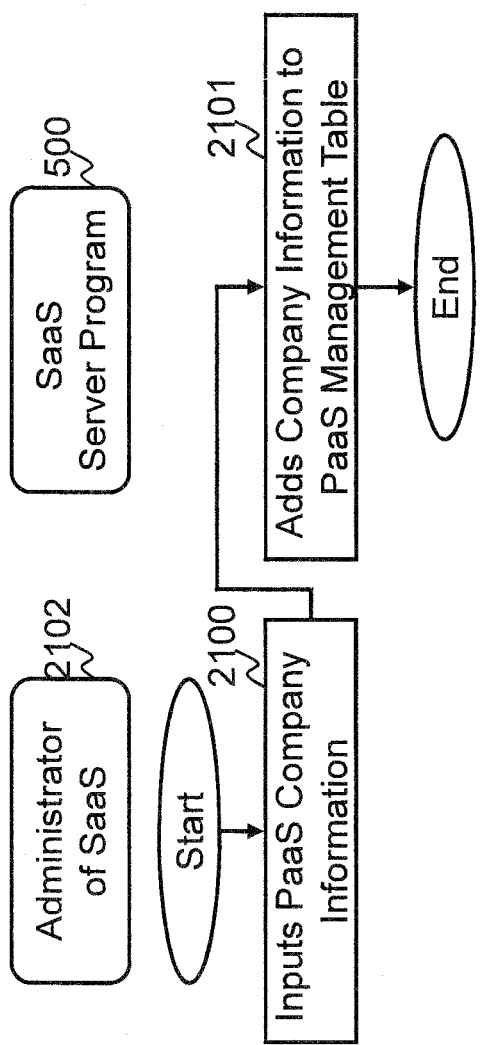
FIG. 21 is a flowchart of PaaS site registration processing of a SaaS site, according to the first embodiment of the present invention.

FIG. 21 is a flowchart of PaaS site registration processing at SaaS site 114.

PaaS site registration processing at the SaaS site 114 is executed as initial processing by a SaaS administrator 2102 before the SaaS server program 500 provides online storage services.

The SaaS administrator 2102 activates the PaaS registration screen of the SaaS server program 500, and inputs the organization name and IP address of the PaaS site (step 2100).

The SaaS server program 500 registers the information input in the PaaS management table 502 (step 2101).

Figure 45:
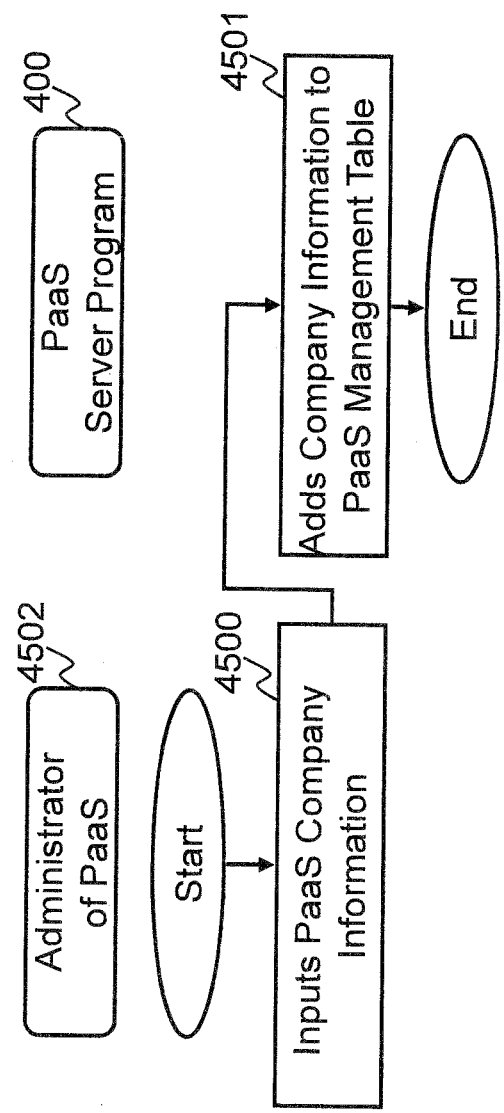
FIG. 45 is a flowchart of PaaS site registration processing at a PaaS site, according to the first embodiment of the present invention.

FIG. 45 is a flowchart of PaaS site registration processing at the PaaS site 107.

The PaaS site registration processing at the PaaS site 107 is executed as initial processing by a PaaS administrator 4502 before the PaaS server program 400 provides online storage services.

The PaaS administrator 4502 activates the PaaS registration screen of the PaaS server program 400, and inputs the organization name and IP address of the PaaS site (step 4500).

The PaaS server program 400 registers the information input in the PaaS management table 403 (step 4501).

Figure 22:
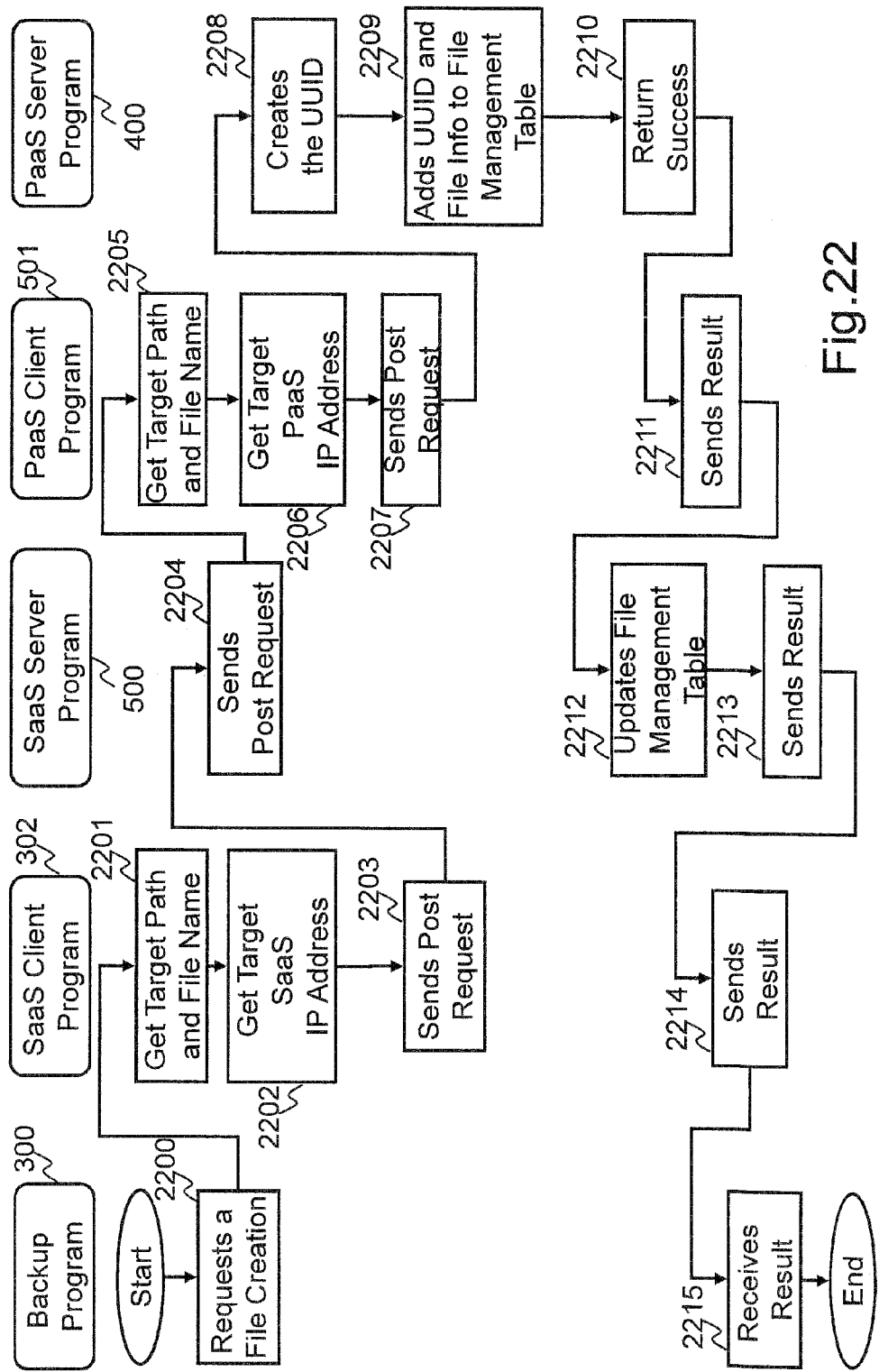
FIG. 22 is a flowchart of new file creation processing, according to the first embodiment of the present invention.

FIG. 22 is a flowchart of new file creation processing.

New file creation processing is executed when a new file is created by the application program 303 and the backup program 300. In new file creation processing, an empty file with no data (content) is created. Here, an example of new file creation processing in which the backup program 300 uses a known WEBDAV standard for backup processing will be described.

The backup program 300 receives a backup ID 800 as a parameter when run by the schedule program 301, and thus identifies the backup being executed.

The backup program 300 specifies the backup source file (original file) indicated by the backup source 801 corresponding to the ID 800 by referring to the backup management table 306, using the received backup ID 800 as a search key, and specifies the backup target indicated by the backup target 802 and corresponding to the ID 800. For example, the path name of the newly created file is the backup target 802, and the file name of the newly created file is the file name of the backup source 801.

The backup program 300 registers the file name 901 of the created file in the file management table 307, and sends a file creation request including the path name and the file name to the SaaS client program 302 (step 2200).

The SaaS client program 302 receives the file creation request and specifies the file name from the request (step 2201).

The SaaS client program 302 uses the file management table 307 to specify the SaaS ID 600 corresponding to the specified file name. The SaaS client program 302 refers to the SaaS management table 304, and specifies the IP address 603 corresponding to the specified SaaS ID 600 (step 2202).

The SaaS client program 302 uses the specified IP address 603 to send a file creation request to the SaaS server program 500 of the SaaS site 114 (step 2203). The file creation request includes the file name specified in step 2201.

The SaaS server program 500 receives a file creation request, and sends the request to the PaaS client program 501 (step 2204).

The PaaS client program 501 receives the file creation request, and specifies the file name from the request (step 2205).

The PaaS client program 501 refers to the file management table 504, and specifies the PaaS ID 1505 corresponding to the specified file name. The PaaS client program 501 specifies the IP address 1303 corresponding to the specified PaaS ID 1505 from the PaaS management table 502 (step 2206).

The PaaS client program 501 uses the specified IP address 1303 to send a file creation request to the PaaS server program 400 of the PaaS site 107 (step 2207).

The PaaS server program 400 receives the file creation request, creates an empty file in response to the received file creation request, and creates a UUID on the basis of a parameter (file name, for example) included in the request (step 2208).

The PaaS server program 400 registers the UUID thus created, and registers the path name and the file name acquired from the file creation request in the file management table 504 (step 2209).

The PaaS server program 400 sends a success response, indicating that the file creation request has succeeded, to the PaaS client program 501 which was the request source (transmission source of the file creation request) (step 2210).

The PaaS client program 501 receives the success response, and sends the received success response to the request-source SaaS server program 500 (step 2211).

Upon receiving the success response, the SaaS server program 500 registers the path name and the file name of the created file, and the PaaS ID of the PaaS site which succeeded in saving the file to the file management table 504 (step 2212).

The SaaS server program 500 sends the success response to the request-source SaaS client program 302 (step 2213).

The SaaS client program 302 receives the success response, and sends the received success response to the backup program 300 (step 2214).

Upon receiving the success response, the backup program 300 ends the file creation processing (step 2215).

Figure 23:
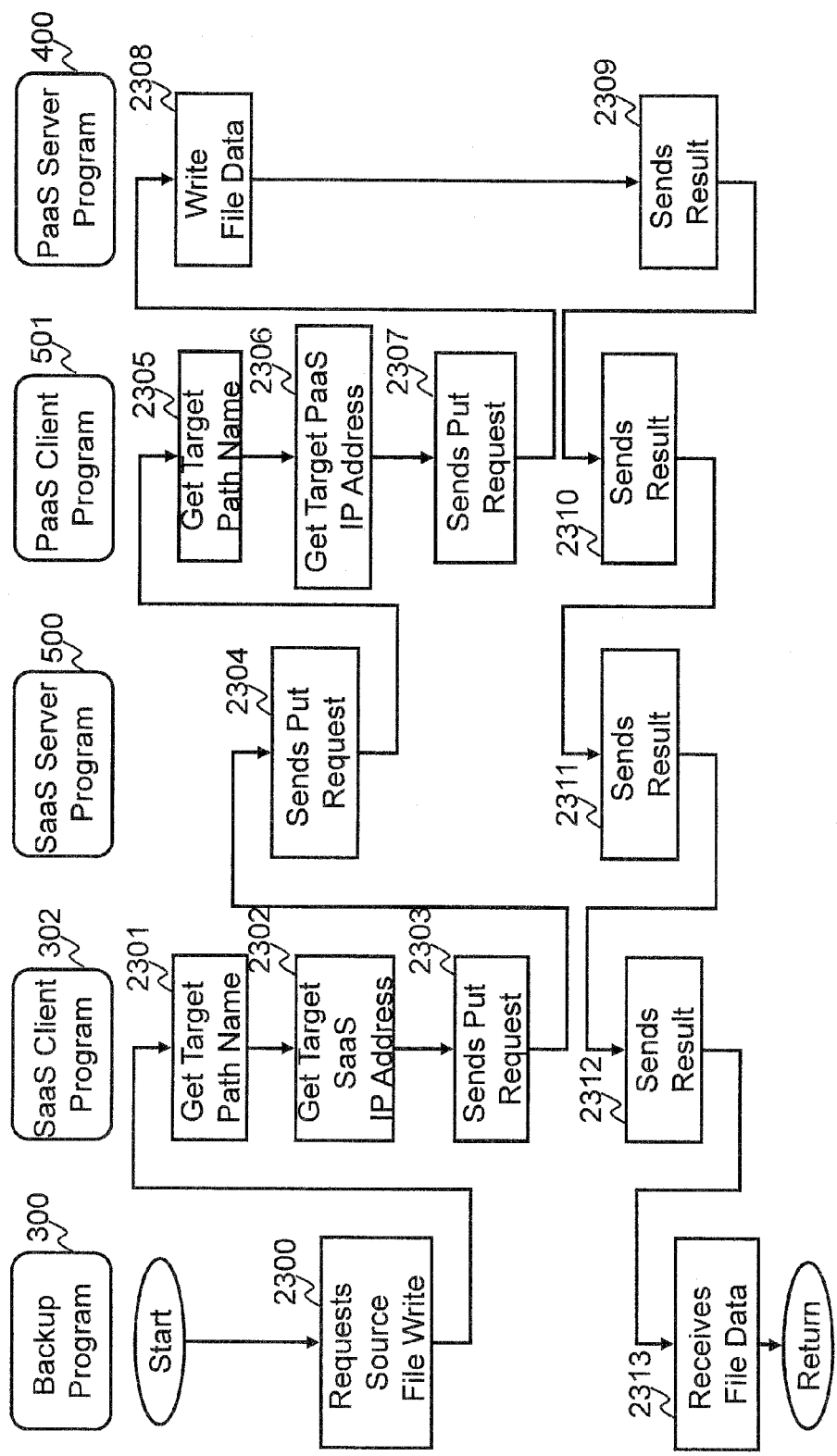
FIG. 23 is a flowchart of write processing of a backup program 300, according to the first embodiment of the present invention.

FIG. 23 is a flowchart of write processing of the backup program 300.

File write processing is processing in which data is written to a newly created empty file (file with no data (content)).

Processing such as file write processing, read processing, and UUID acquisition processing is sent to the PaaS site 107 via the SaaS site 114 from the backup program 300 of the user site 100 in the same way as the new file creation processing illustrated in FIG. 22. Hence, similar processing will not be described hereinbelow since the focus of the description will be on differences.

File write processing is executed when the application program 303 and the backup program 300 write a file. Here, an example of file write processing in which the backup program 300 uses a known WEBDAV standard for backup processing will be described.

Figure 24:
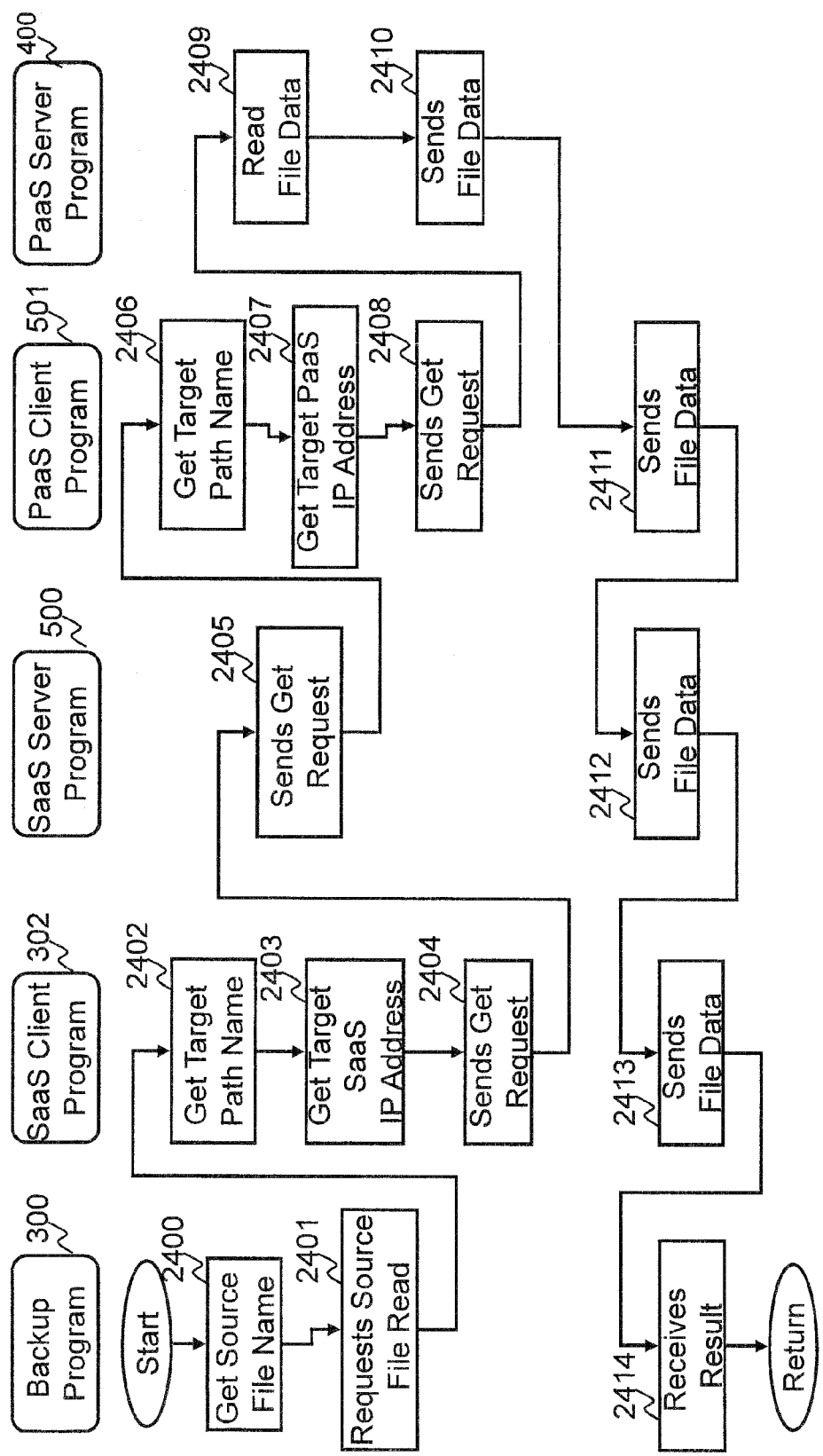
FIG. 24 is a flowchart of read processing of the backup program 300, according to the first embodiment of the present invention.

The backup program 300 sends a file write request, including the path name of the file to be written, the file name, and write data (for example, the file data read by the read processing in FIG. 24 (original file data)) to the SaaS client program 302 (step 2300).

The SaaS client program 302 receives the file write request, and sends the request to the PaaS server program 400 via the SaaS site 114. Specifically, the same processing as for steps 2201 to 2207 in FIG. 22 is carried out (steps 2301 to 2307).

The PaaS server program 400 receives the write request and writes the data of the received request to a file specified by the received request (step 2308).

The PaaS server program 400 sends a success response to the backup program 300 of the user site 100 via the SaaS site 114, and the write processing ends. More specifically, the same processing is performed as in steps 2210, 2211, 2213, 2214, and 2215 in FIG. 22 (steps 2309 to step 2313). Note that, as can be seen in a comparison with FIGS. 22 and 24, the SaaS server program 500 does not update the file management table 504 in steps 2309 to 2313.

FIG. 24 is a flowchart of read processing of the backup program 300.

The file read processing is executed when the application program 303 and the backup program 300 read a file. Here, an example of file read processing in which the backup program 300 uses a known WEBDAV standard for backup processing is described.

The backup program 300 specifies the name of the file to be read from the backup source 801 of the backup management table 306 (step 2400).

The backup program 300 sends a file read request which includes the path name and the file name of the file to be read to the SaaS client program 302 (2401).

The SaaS client program 302 sends the file read request to the PaaS server program 400 via the SaaS site 114. More specifically, the same processing as in steps 2201 to 2207 in FIG. 22 is carried out (steps 2402 to 2408).

The PaaS server program 400 reads the data from the file specified by the read request (step 2409).

The PaaS server program 400 sends the read data (file data) as a success response to the backup program 300 of the user site 100 via the SaaS site 114, and the read processing ends. More specifically, the same processing as in steps 2210, 2211, 2213, 2214, and 2215 in FIG. 22 is carried out (steps 2410 to 2414). Note that, as can be seen in comparison with FIGS. 22 and 24, the SaaS server program 500 does not update the file management table 504 in steps 2410 to 2414.

Figure 25:
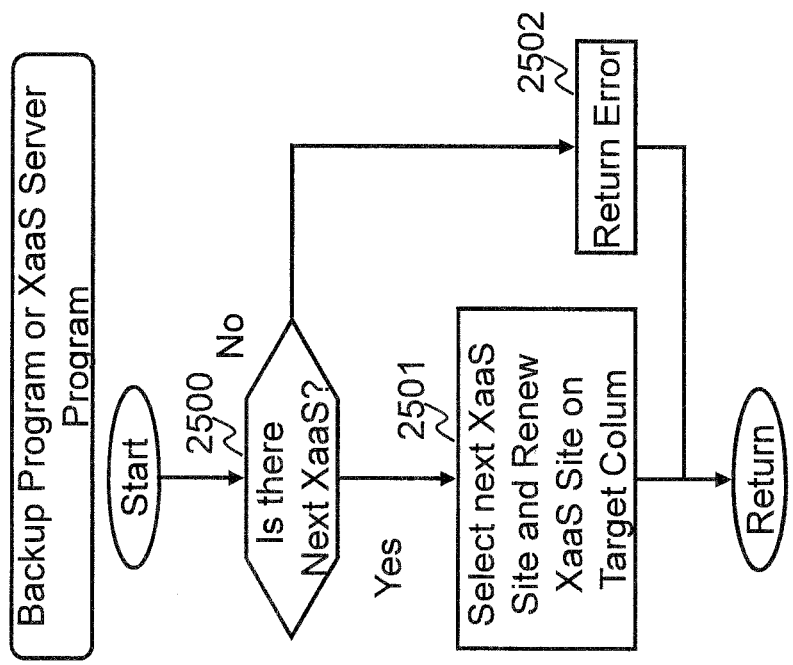
FIG. 25 is a flowchart of XaaS selection processing, according to the first embodiment of the present invention.

FIG. 25 is a flowchart of XaaS selection processing.

XaaS selection processing is a general name for SaaS selection processing at the user site 100, PaaS selection processing at a SaaS site, and PaaS selection processing at a PaaS site (in other words, substituting S or P for X). This processing is executed by each program as a subroutine.

The backup target 802 registered in the backup management table 306 is the default backup target, for example. Here, SaaS selection processing at the user site 100 will be described by way of example.

The backup program 300 specifies a drive name indicated by the backup target 802 in a row selected from the backup management table 306. The backup program 300 specifies the mount point 604 of the drive with the specified drive name from the SaaS management table 304, and specifies the SaaS ID 600 corresponding to the specified mount point 604 from the SaaS management table 304. The backup program 300 judges whether or not a SaaS ID 600, not selected in the backup processing being executed by the SaaS ID 600 excluding the specified SaaS ID (default SaaS ID) 600 is in the SaaS management table 304 (step 2500). Although not illustrated, this judgment can be implemented by adding a column of flags, indicating whether a SaaS has been selected, to the SaaS management table 304, for example. The backup program 300 judges that there are no unselected SaaS IDs 600 when the flags of SaaS IDs 600, for which the mount point 604 is registered, are all '1'. The backup program 300 judges that there is an unselected SaaS ID 600 when there is a flag at '0' for a SaaS ID 600 for which the mount point 604 is registered. Whenever the backup program 300 starts file backup processing, the backup program 300 registers '1' for a default SaaS ID 600, and registers '0' for all other SaaS IDs.

In cases where it is judged that there is an unselected SaaS ID 600, the backup program 300 registers a '1' for a flag indicating whether the SaaS corresponding to the unselected SaaS ID 600 has been selected, selects the unselected SaaS ID 600 in the SaaS management table 304 and sends the unselected SaaS ID 600 to a calling program (step 2501).

When it is judged that there is no unselected SaaS ID 600, the backup program 300 sends an error, indicating that there is no selectable SaaS ID 600, to the calling program (step 2502).

This XaaS selection processing is selection processing for the PaaS ID 1300 at the SaaS site 114, and selection processing for the PaaS ID 1200 at the PaaS site 107.

Figure 26:
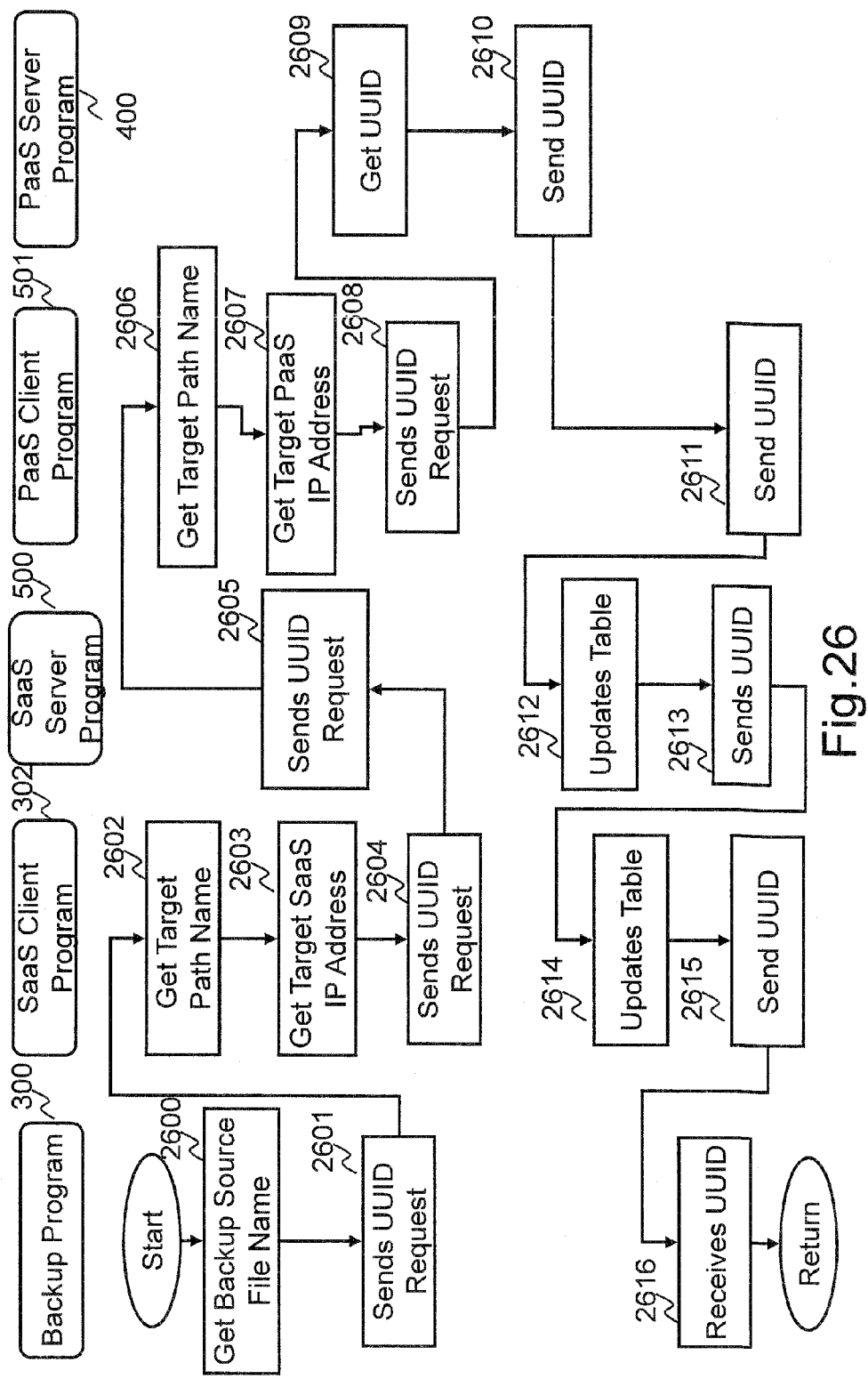
FIG. 26 is a flowchart of file UUID acquisition processing, according to the first embodiment of the present invention.

FIG. 26 a flowchart of file UUID acquisition processing.

File UUID acquisition processing is executed when the backup program 300 acquires the UUID of a backup source file from a PaaS site.

The backup program 300 acquires the backup source 801 of the backup management table 306, and specifies the name of the file from which the UUID was acquired from the backup source 801 (step 2600).

The backup program 300 sends a UUID request (see FIG. 16) to the PaaS server program 400 via the SaaS site 114 (steps 2601 to step 2608).

The PaaS server program 400 acquires the UUID 1503 corresponding to the file name in the UUID request from the file management table 504 (step 2609).

The PaaS server program 400 sends the UUID to the backup program 300 of the user site 100 via the SaaS site 114 as a success response (see FIG. 17), and the UUID acquisition processing ends (steps 2610 to 2616). Here, the SaaS server program 500 changes the UUID 1503 in the file management table 504 to the UUID received in response (step 2612). Likewise, the SaaS client program 302 changes the UUID 902 of the file management table 307 to the UUID received in response (step 2614).

FIG. 27 shows an example of the WEBDAV property management table 404 in the PaaS server 206.

The WEBDAV property management table 404 is created during file creation. The logic address where data is registered to establish an association with the file is registered in the WEBDAV pointer 1104 in the file management table 402.

The WEBDAV property management table 404 includes a property name 2700 and a value 2701 for each WEBDAV property.

The property name 2700 constituting a WEBDAV property is determined under the WEBDAV standard. In this embodiment, a property name such as UUID 2704, for example, is added to extend the property name.

The value 2701 is the value of the property name 2700. For example, a file creation date and time is registered as the property name 'creationdate' 2702, and the file display name is registered as the property name 'displayname' 2703. The UUID 1102 registered in the file management table 402 is stored as the UUID 2704.

Figure 28:
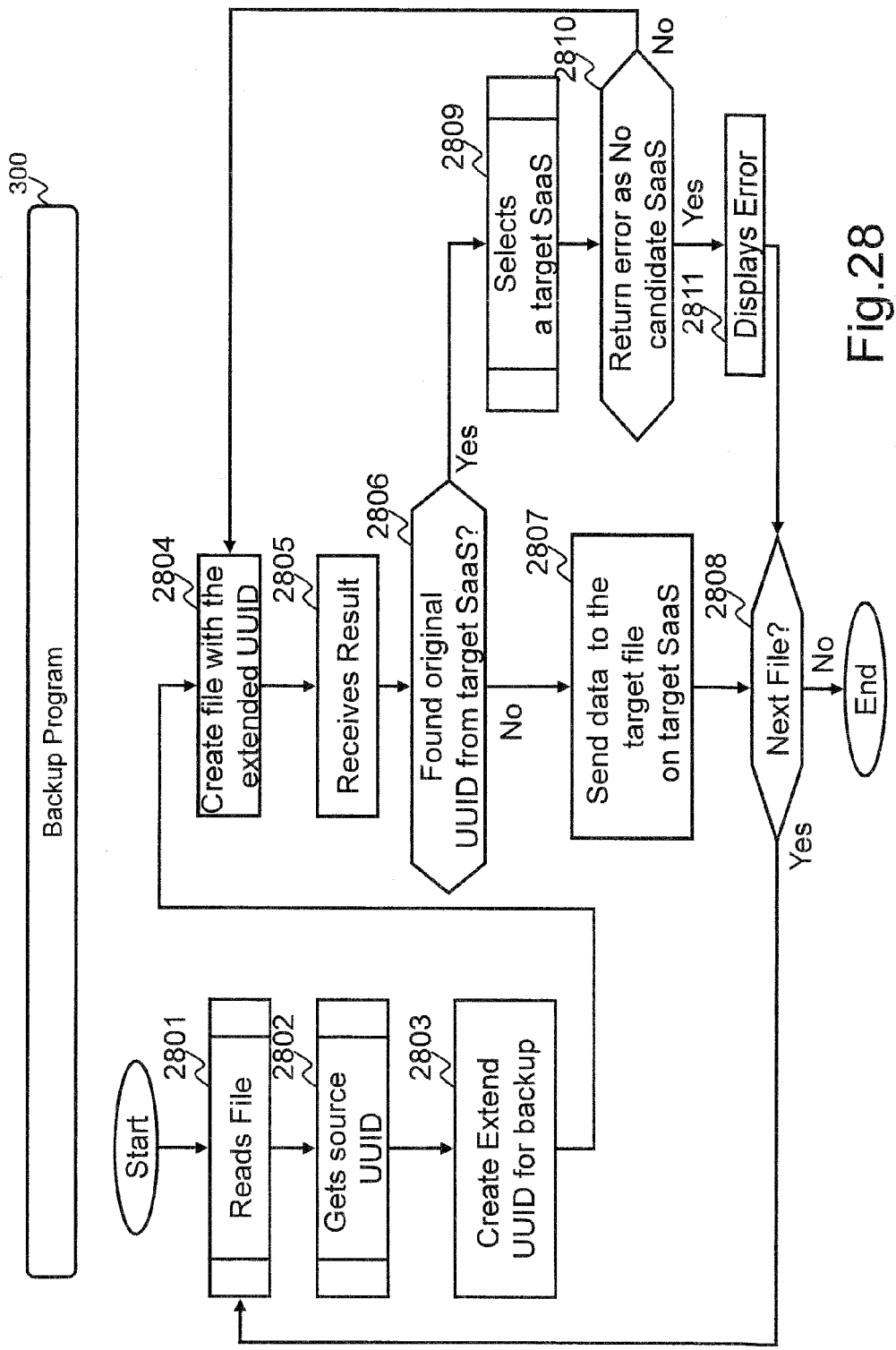
FIG. 28 is a flowchart of backup processing of the backup program 300, according to the first embodiment of the present invention.

FIG. 28 is a flowchart of backup processing of the backup program 300.

This processing is processing of the backup program 300, which is executed by the schedule program 301 at the backup start time. Hereinafter, a backup schedule with this start time will be referred to as the 'target schedule' in the description of FIG. 28.

The backup program 300 reads the backup source file in the read processing in FIG. 24 (step 2801). The backup source file is a file indicated by the backup source 801 corresponding to the target schedule ID.

The backup program 300 acquires the UUID of the read backup source file in the UUID acquisition processing of FIG. 26 (step 2802).

The backup program 300 creates an extended UUID by adding a backup identifier to the acquired UUID (step 2803).

The backup program 300 sends a new file creation request, directed toward the backup target 802 corresponding to the target schedule ID and including the extended UUID (hereinafter called a 'new backup file creation request'; see FIG. 18), to the SaaS site 114 by using the IP address 603 for the SaaS ID 600 corresponding to the backup source file (step 2804).

The backup program 300 receives a response to the request from the SaaS site 114 to which the new backup file creation request was sent (step 2805).

The backup program 300 analyzes the received response, and judges whether or not a file with a UUID identical to the UUID (hereinafter called the 'original UUID') of the backup source file has been found from the PaaS site 107 managed by the SaaS site 114 to which the new backup file creation request was sent (step 2806).

When a no file found judgment is made, the backup program 300 sends file data read in step 2801 to the SaaS site 114 in which the original UUID was not found (step 2807).

On the other hand, when a file found judgment is made, the backup program 300 acquires the results of executing XaaS selection processing (see FIG. 25) in order to determine the next SaaS site 114 to which the new backup file creation request is to be sent (step 2809). The backup program 300 then judges whether or not there is an error, such as the results of the XaaS selection processing indicating that no subsequent candidate SaaS site 114 was found (step 2810). When no error is judged, the backup program 300 executes the processing of step 2804. When, on the other hand, an error is judged, the backup program 300 displays the error on a user management terminal via a GUI, for example (2811). Note that a method with which the backup program 300 determines the SaaS site 114 that is to serve as the backup target will be described subsequently, but the user administrator may also select the backup-target SaaS site 114.

The backup program 300 judges whether or not files to be backed up still remain (step 2808). When it is judged that such files still remain, the backup program 300 executes the processing of step 2801 for those files to be backed up, ending the backup processing upon judging that there are no more files to be backed up.

Figure 29:
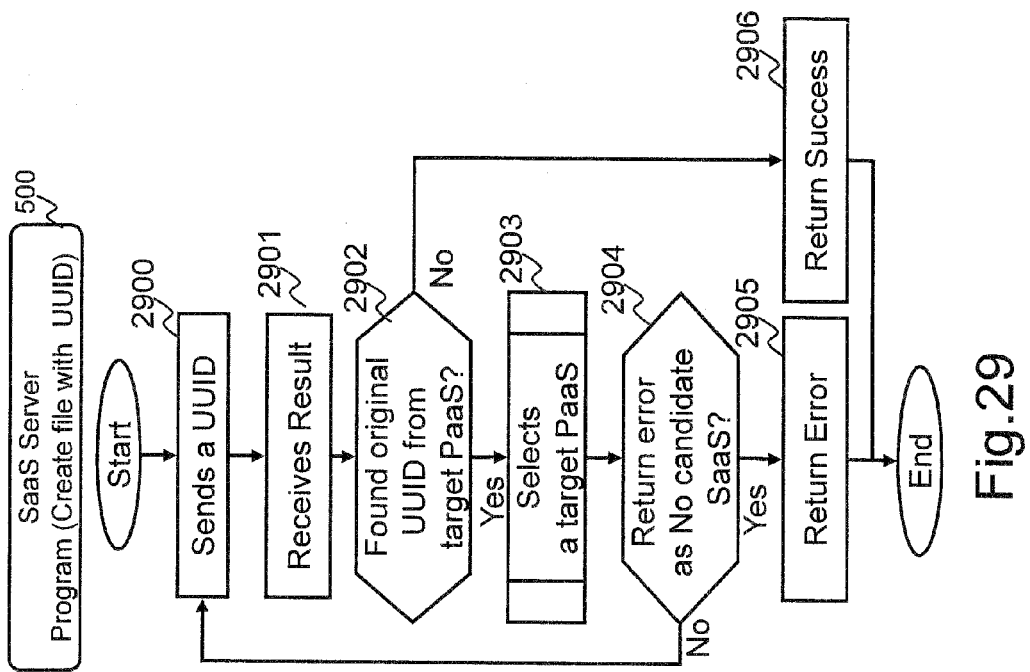
FIG. 29 is a flowchart of file creation processing of a SaaS server program 500, according to the first embodiment of the present invention.

FIG. 29 is a flowchart of file creation processing of the SaaS server program 500.

This processing is executed when the SaaS server program 500 receives a new backup file creation request from the user site 100.

The SaaS server program 500 sends a new backup file creation request to the PaaS site 107 selected from one or more backup target candidate PaaS sites 107 managed by the PaaS management table 502 (step 2900).

The SaaS server program 500 receives a response to the request from the PaaS site 107 to which the new backup file creation request was sent (2901).

The SaaS server program 500 judges, from the received response, whether or not a file with a UUID identical to the UUID (hereinafter called the 'original UUID') of the backup source file has been found from the PaaS site 107 managed by the PaaS site 107 to which the request was sent (step 2902).

When a no file found judgment is made, the SaaS server program 500 sends a success response to the request to the request-source SaaS site 114 (step 2906).

When a file found judgment is made, the SaaS server program 500 acquires the results of executing XaaS selection processing (see FIG. 25) in order to determine the next PaaS site 107 to which the new backup file creation request is to be sent (step 2903). The SaaS server program 500 judges whether or not there is an error, such as the results of the XaaS selection processing indicating that no subsequent candidate PaaS site 107 was found (2904). When no error is judged, the SaaS server program 500 executes the processing of step 2900. When an error is judged, the SaaS server program 500 sends an error response to the request to the request-source SaaS site 114 (step 2905).

Figure 30:
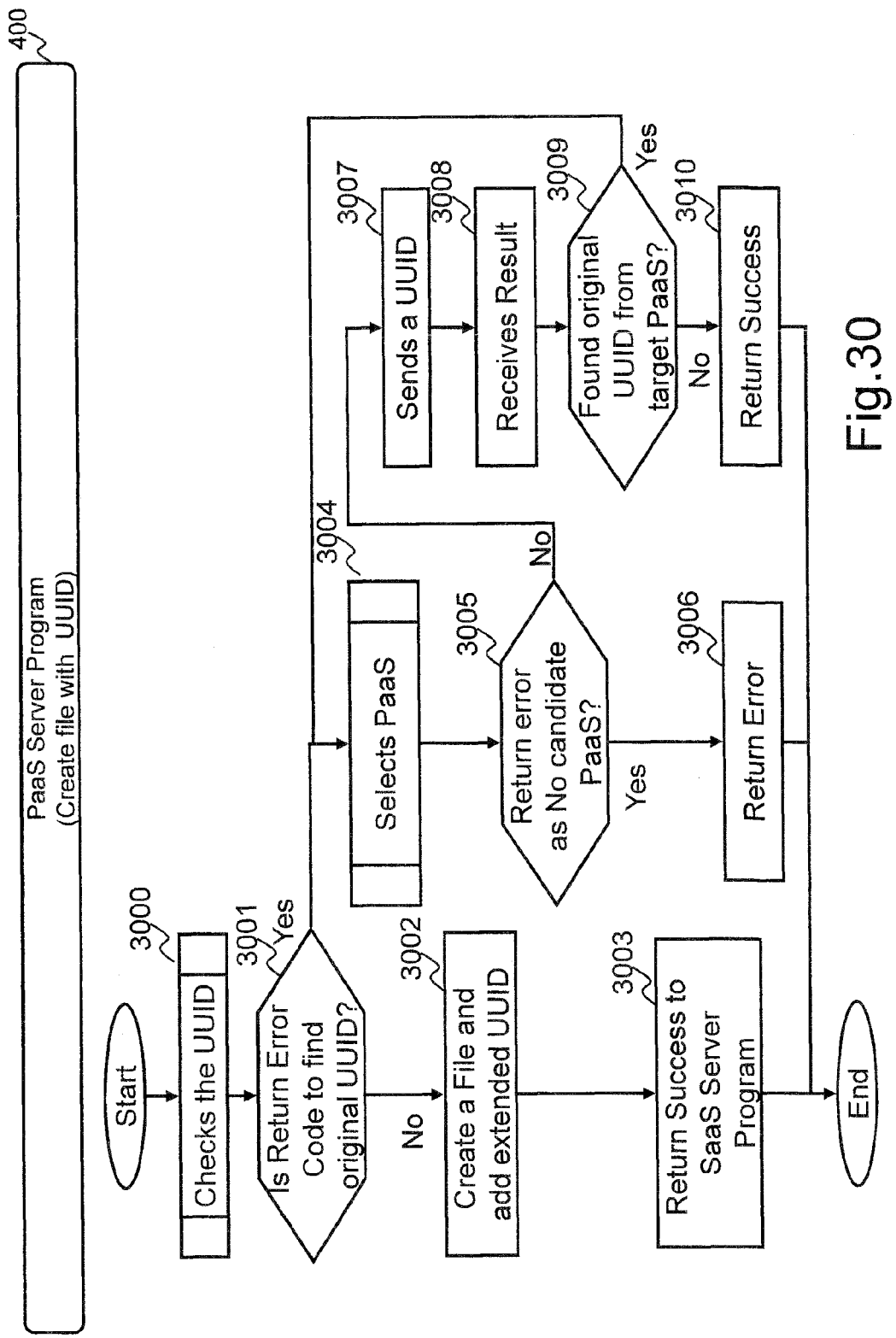
FIG. 30 is a flowchart of backup processing of a PaaS server program 400, according to the first embodiment of the present invention.

FIG. 30 is a flowchart of the backup processing of the PaaS server program 400.

This processing is executed when the PaaS server program 400 receives a new backup file creation request from the SaaS site 114.

The PaaS server program 400 acquires an original UUID, except for the backup identifier, from the extended UUID of the received request. The PaaS server program 400 then acquires the results of executing UUID check processing (see FIG. 31) (step 3000).

The PaaS server program 400 judges, from the acquired results, whether or not a file with a UUID identical to the original UUID has been found (step 3001).

When a no file found judgment is made, the PaaS server program 400 creates a file using the path name, the file name, and the extended UUID included in the new backup file creation request (step 3002). The PaaS server program 400 sends a success response to the request-source SaaS site 114 (step 3003).

When, on the other hand, a file found judgment is made, the PaaS server program 400 acquires the results of executing XaaS selection processing (see FIG. 25) in order to determine the next PaaS site 107 to which the new backup file creation request is to be sent (step 3004). The PaaS server program 400 judges whether or not there is an error, such as the results of the XaaS selection processing indicating that no subsequent candidate PaaS site 107 was found (step 3005).

When an error is judged, the PaaS server program 400 sends a request error response to the request-source PaaS site 107 (step 3006).

When no error is judged, the PaaS server program 400 sends a new backup file creation request to a PaaS site 107 selected from one or more backup target candidate PaaS sites 107 managed by the PaaS management table 403 (step 3007). The PaaS server program 400 receives a response to the request from the PaaS site 107 (step 3008). The PaaS server program 400 then judges, from the received response, whether or not a file with a UUID identical to the original UUID has been found from the PaaS site 107 managed by the PaaS site 107 to which the request was sent (step 3009). When a file found judgment is made, the PaaS server program 400 executes the processing of step 3004. When a no file found judgment is made, the PaaS program 400 sends a request success response to the request-source SaaS site 114 (step 3010).

Figure 31:
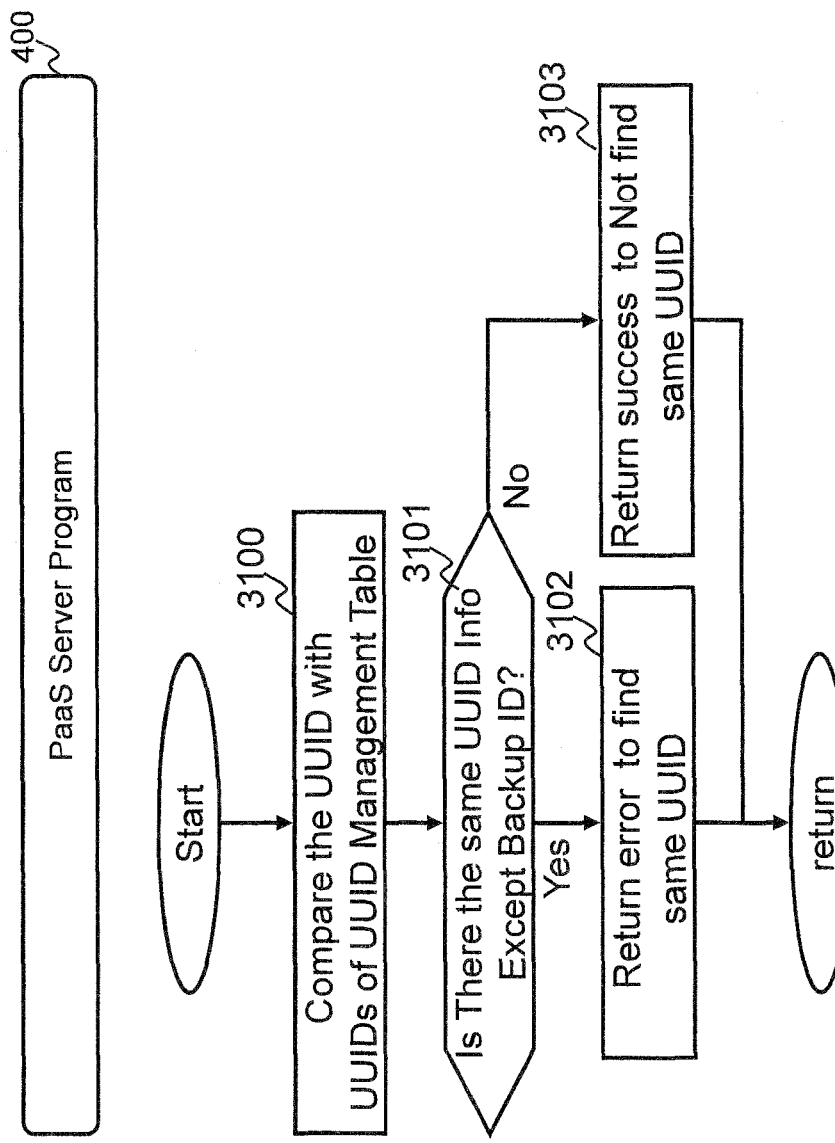
FIG. 31 is a flowchart of UUID check processing, according to the first embodiment of the present invention.

FIG. 31 is a flowchart of UUID check processing.

This processing is executed when the PaaS server program 400 executes UUID check processing.

A PaaS server program 400 compares the original UUID, excluding the backup ID from the extended UUID, with all the UUIDs 1102 in the file management table 402 (3100).

The PaaS server program 400 judges whether or not a UUID 1102 identical to the original UUID exists (step 3101).

When a UUID found judgment is made, the PaaS server program 400 returns an error, indicating that an identical UUID has been found (step 3102).

When a UUID not found judgment is made, the PaaS server program 400 returns a success response, indicating that an identical UUID has not been found (step 3103).

As described hereinabove, by acquiring the UUID of the backup source file and by checking, during backup, that a file with an identical UUID has not been saved at the backup target PaaS site, it can be ensured that the backup file is not stored in the backup source PaaS site 107 that has the original file. Consequently, even when there is a disaster involving data loss at one PaaS site 107, one of the original file and the backup file is not lost and remains available.

When the first embodiment above and one or more modifications of the first embodiment are considered, the computer system according to the first embodiment can be implemented as follows, for example.

In other words, the backup apparatus (user server, for example) adds backup identification information (extended UUID, for example), which is identification information including original data identification information (the UUID or another type of identification information may be adopted, for example) and information signifying a backup (backup identifier, for example), to the backup data, and sends a backup file storage request to which backup identification information was added. The storage request may be sent to the storage system via a relay apparatus such as a SaaS server, or may be sent to the storage system without passing via such a relay apparatus.

A first storage system, which receives the request to store the backup data to which the backup identification information was added, judges, in response to the received storage request, whether or not identification information, identical to the original data identification information, in the backup identification information added to the backup data, is being managed, and if the judgment result is negative, stores the backup data.

On the other hand, when the judgment result is positive, the first storage system or a relay apparatus for relaying the storage request selects a second storage system which belongs to an organization and/or location different from an organization and/or location to which the first storage system belongs, on the basis of organization/location information indicating organizations and/or locations to which storage systems coupled to the first storage system or the relay apparatus belong, and sends a storage request, for the backup data to which the backup identification information was added, to the second storage system. In other words, a storage request may be sent from the first storage system to the second storage system without passing via a relay apparatus such as a SaaS server, or the relay apparatus may send a storage request to the second storage system in cases where an error response is received from the first storage system.

Note that, like the first storage system, the second storage system may, after receiving the storage request, judge whether or not identification information, identical to identification information included in the backup identification information added to the backup data, is being managed.

Furthermore, the first storage system may only judge whether or not identification information identical to original data identification information in the backup identification information is being managed only when information signifying a backup is detected from the backup identification information.

Furthermore, the second storage system, to which the storage request is sent, may be a storage system that belongs to a location farthest from the location to which the first storage system belongs.

In addition, in cases where any storage system coupled to the first storage system or the relay apparatus is a storage system identical to that of an organization and/or location to which the first storage system belongs, the first storage system or relay apparatus, may, upon receiving a storage request, return an error to the backup apparatus. In this case, the backup apparatus may send the storage request to a storage system or relay apparatus different from the first storage system or relay apparatus.

Embodiment 2

A second embodiment of the present invention will be described hereinbelow. In so doing, differences from the first embodiment will mainly be described, and points in common with the first embodiment will be described simply or omitted.

According to the second embodiment, a UUID which includes a volume identifier of a file (virtual machine file, for example) saved in the storage apparatus 223 of the PaaS site 107, is used to avoid saving an original file and a backup file thereof in the same storage apparatus.

Figure 32:
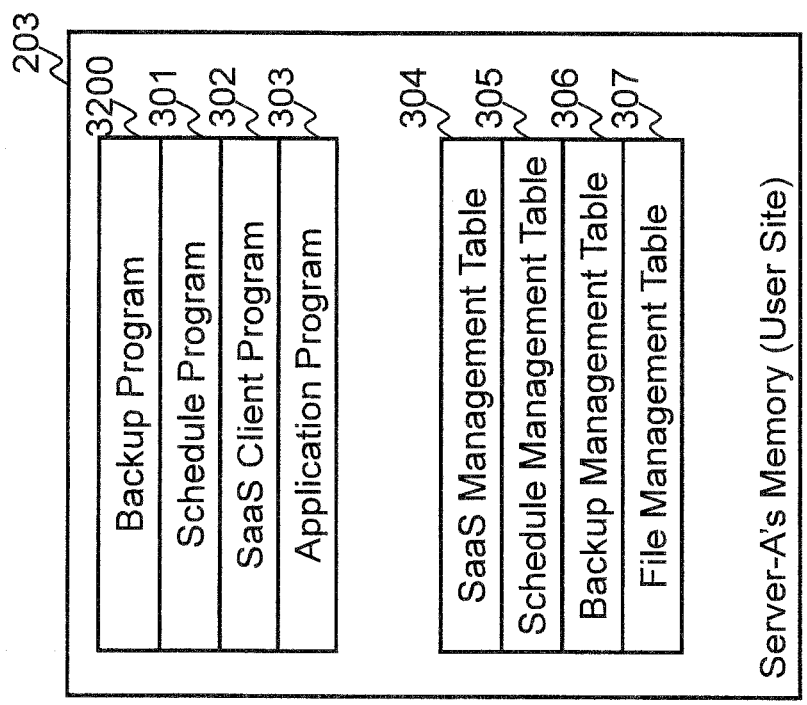
FIG. 32 shows an example of programs and information that are stored in the memory 203 in the user server, according to a second embodiment of the present invention.

FIG. 32 shows an example of programs and information that are stored in the memory 203 in the user server.

A backup program 3200 does not perform backup-source file UUID acquisition processing, extended UUID creation processing, or send a new backup file creation request including an extended UUID, during a backup. The UUID 902 of the file management table 307 is not used.

Figure 33:
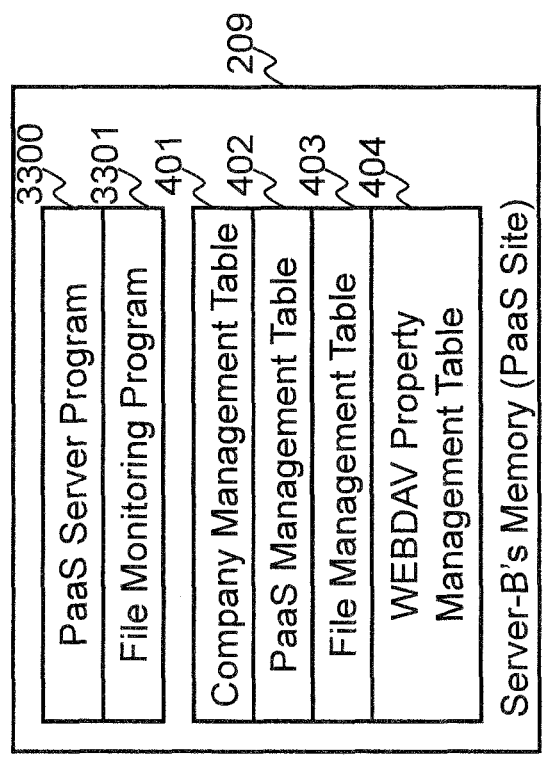
FIG. 33 shows an example of programs and information that are stored in the memory 209 in the PaaS server, according to the second embodiment of the present invention.

FIG. 33 shows an example of programs and information that are stored in the memory 209 in the PaaS server.

A PaaS server program 3300 executes processing when writing to a file is requested.

A file monitoring program 3301 is a program for monitoring file writing content.

A UUID acquired from within a virtual machine file by the file management program 3301 is registered in the extended UUID 1103 of the file management table 402.

Figure 34:
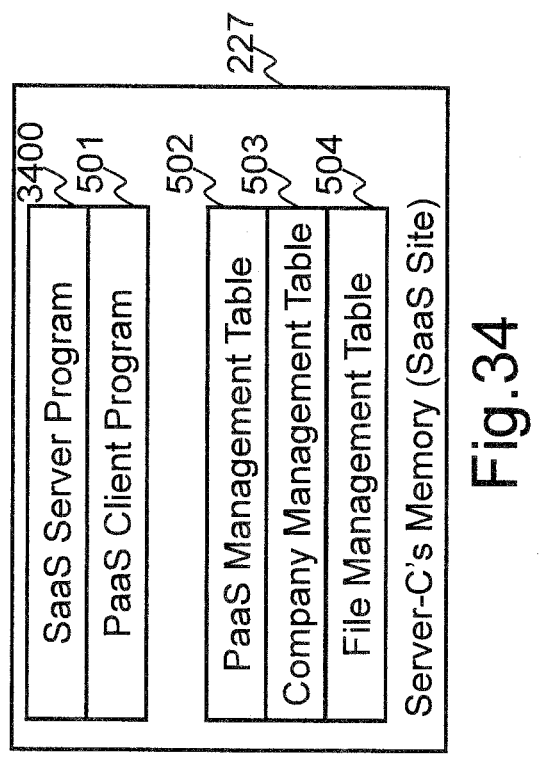
FIG. 34 shows an example of programs and information that are stored in the memory 227 in the SaaS server, according to the second embodiment of the present invention.

FIG. 34 shows an example of programs and information that are stored in the memory 227 in the SaaS server.

The SaaS server program 3400 executes processing when writing to a file is requested.

Figure 35:
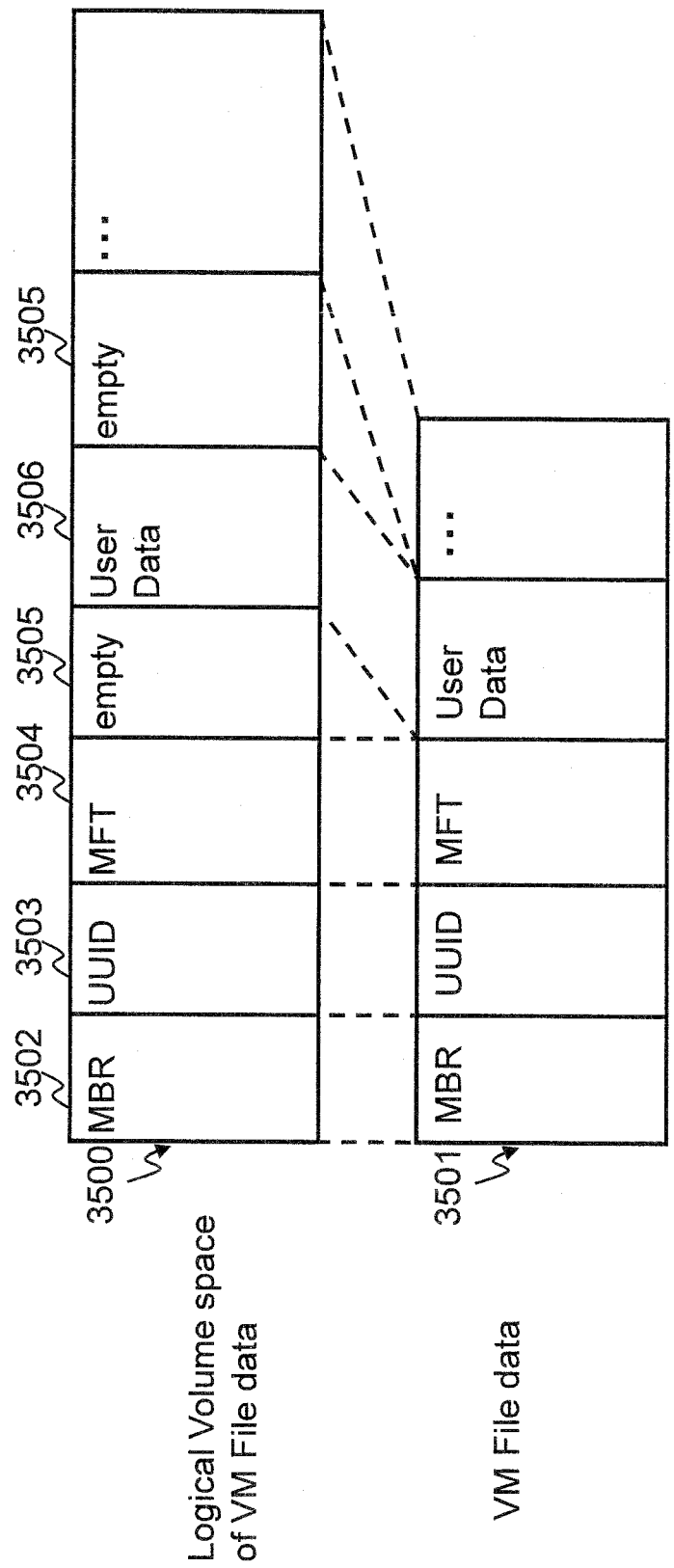
FIG. 35 shows an example of the logical composition of a virtual machine file, according to the second embodiment of the present invention.

FIG. 35 shows an example of the logical composition of a virtual machine file.

A logical volume space 3500 of a virtual machine file mainly includes respective regions for an MBR 3502, a UUID 3503, an MFT 3504, empty data 3505, and user data 3506.

The MBR 3502 is a region in which partition-related information is stored in a Master Boot Record.

The UUID 3503 is a region in which a unique ID for identifying the logical volume of the virtual machine file is stored.

The MFT 3504 is a region in which file management-related information is stored in a Master File Table.

The empty data 3505 is a region in which logical volume-formatted data is written, or a region to which no data is written.

The user data 3506 is a region to which the users of the virtual file are written.

The logical composition 3501 of a virtual machine file is such that empty data of the logical volume space 3500 of the virtual machine file are stored in a compressed state, for example.

Figure 36:
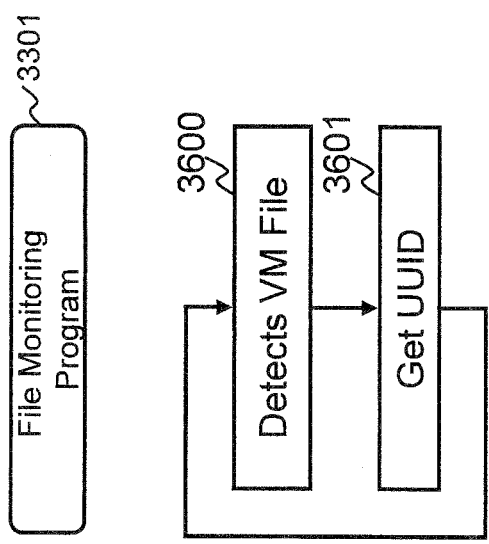
FIG. 36 is a flowchart of virtual file UUID acquisition processing, according to the second embodiment of the present invention.

FIG. 36 is a flowchart of virtual machine file UUID acquisition processing.

This processing is activated by the PaaS server 206, and executed before the file is written. This processing is executed by the file monitoring program 3301 at all times.

The file monitoring program 3301 detects a virtual machine file written to the file system. For example, the file monitoring program 3301 monitors file extensions. More specifically, in cases where a virtual machine file extension is "vmvm", for example, when a file with a file name "vmfile.vmvm" is newly created, the file monitoring program 3301 detects the fact that the file is a virtual machine file and monitors writing (step 3600).

The file monitoring program 3301 is capable of identifying the logical structure of a virtual file with a virtual machine file extension, and of specifying the position in which the UUID 3503 is written (position within the virtual machine file).

Upon detection of a virtual machine file, the file monitoring program 3301 specifies the position of the UUID 3503 within the detected virtual machine file, and reads the UUID 3503. The file monitoring program 3301 then registers the read UUID 3503 in the location of the extended UUID within the file management table 402 (step 3601). The processing of this step is executable as long as the position of the UUID 3503 is written before file writing is complete.

Figure 37:
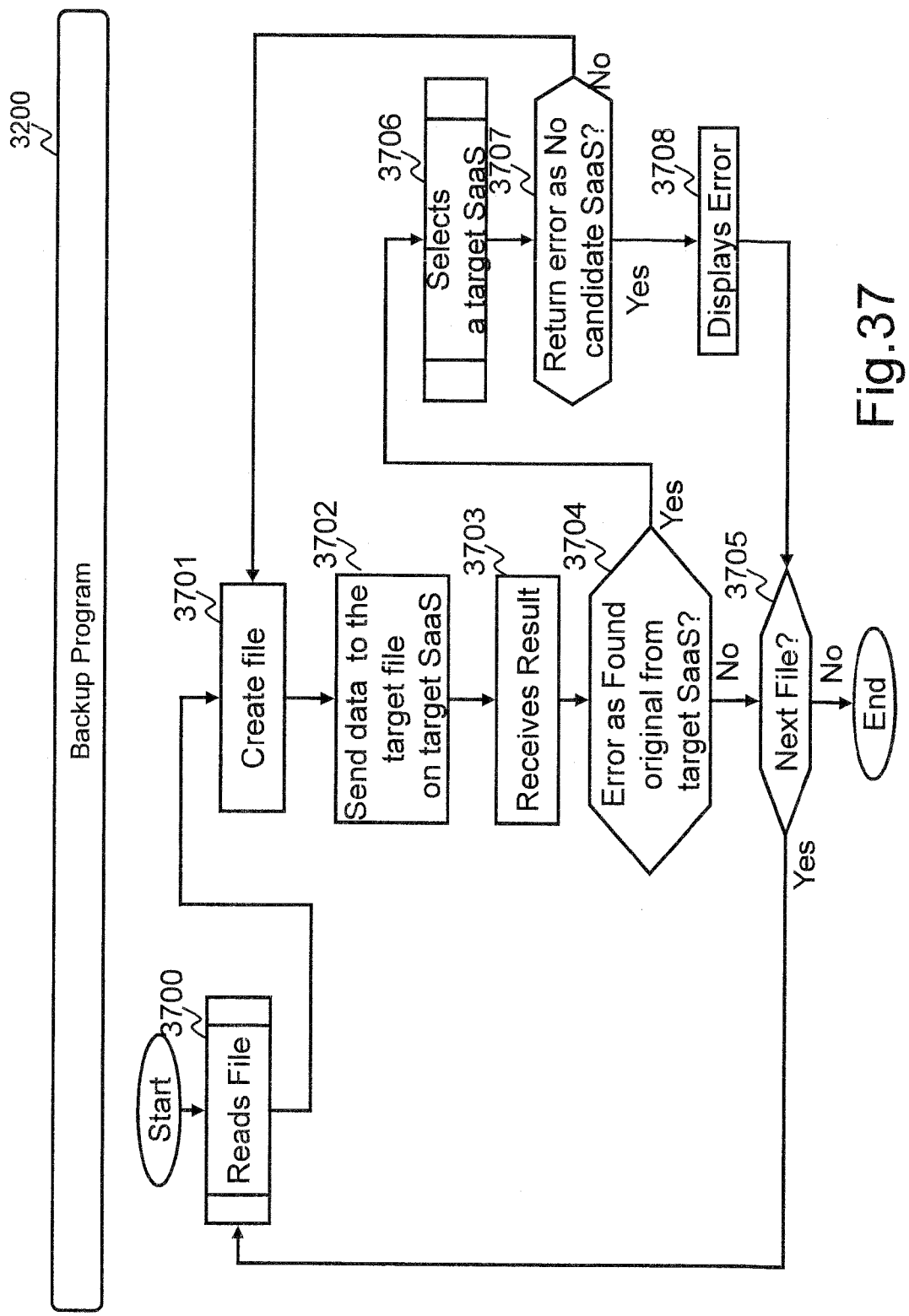
FIG. 37 is a flowchart of backup processing by a backup program 3200, according to the second embodiment of the present invention.

FIG. 37 is a flowchart of backup processing of the backup program 3200.

This processing is executed by the backup program 3200, which is run by the schedule program 301 at the backup start time. A backup schedule with this start time will be referred to hereinbelow as 'target schedule' in the description of FIG. 37.

The backup program 3200 reads the backup source file in the read processing see (FIG. 24) (step 3700). The backup source file is a file indicated by the backup source 801 corresponding to the target schedule ID.

The backup program 3200 sends a new file creation request for the backup target indicated by the backup target 802 corresponding to the target schedule ID, to the SaaS site 114 (step 3701).

After receiving a success response to the new file creation request, the backup program 3200 sends file data to the backup target SaaS site 114 in file write processing (see FIG. 23) (step 3702).

The backup program 3200 receives a write processing response from the SaaS site 114 (step 3703).

The backup program 3200 judges, from the received response, whether or not a file with a UUID identical to the UUID in the backup-source virtual machine file (referred to hereinafter as the 'original VM UUID') has been found from the PaaS site 107 managed by the SaaS site 114 to which the request was sent (step 3704).

When a no file found judgment is made, the backup program 3200 judges whether or not a file to be backed up still remains (step 3705). When a remaining file judgment is made, the backup program 3200 executes the processing of step 3700 for files to be backed up. When a no remaining file judgment is made, the backup program 3200 ends the backup processing.

When a file found judgment is made, the backup program 3200 acquires the results of executing XaaS selection processing (see FIG. 25) in order to determine the SaaS sites 114 to which the write request is to be sent next (step 3706). The backup program 3200 judges whether there is an error, such as the results of the XaaS selection processing indicating that no subsequent candidate SaaS site 114 was found (step 3707). When no error is judged, the backup program 3200 executes the processing of step 3701. When an error is judged, the backup program 3200 displays this error on the user management terminal via a GUI, for example (step 3708).

Figure 38:
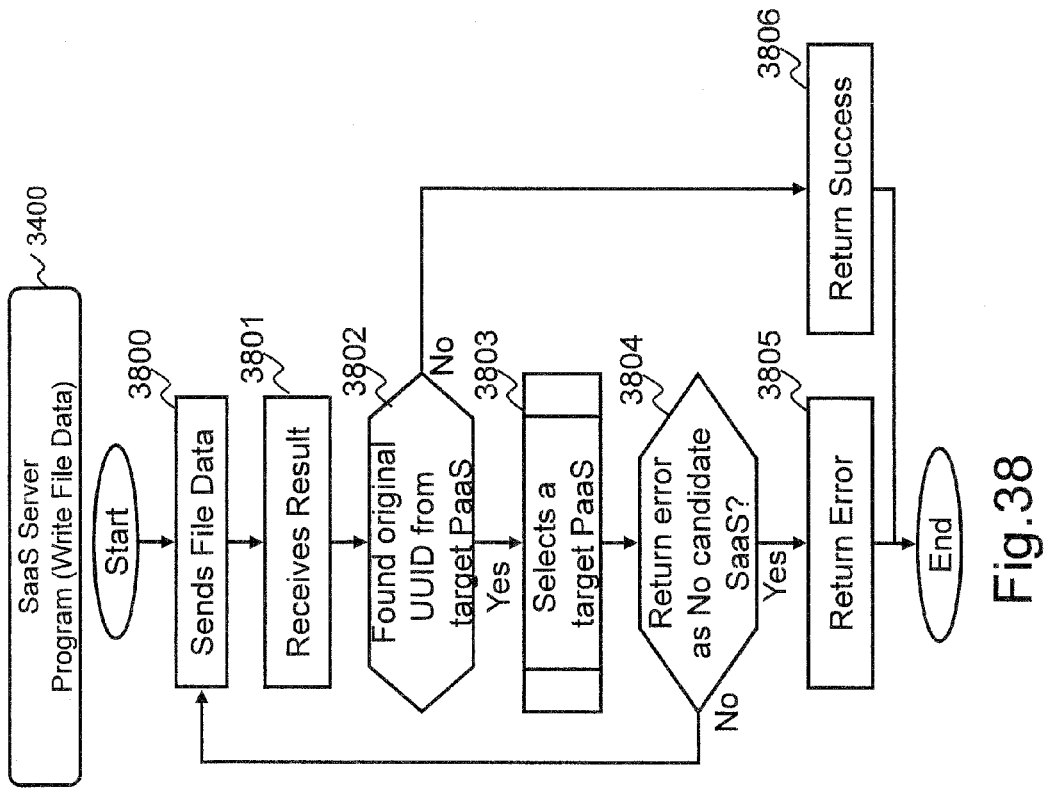
FIG. 38 is a flowchart of backup processing by a SaaS server program 3400, according to the second embodiment of the present invention.

FIG. 38 is a flowchart of backup processing of the SaaS server program 3400.

This processing is executed when the SaaS server program 3400 receives a backup file write request from the user site 100.

The SaaS server program 3400 sends the backup file write request to a PaaS site 107 selected from one or more backup target candidate PaaS sites 107 managed by the PaaS management table 502 (step 3800).

The SaaS server program 3400 receives a response from the PaaS site 107 (3801).

The SaaS server program 3400 judges, from the received response, whether or not a file with a UUID identical to the original VM UUID has been found from the PaaS site 107 managed by the PaaS site 107 to which the request was sent (step 3802).

When a no file found judgment is made, the SaaS server program 3400 sends a request success response to the request-source SaaS site 114 (step 3806).

When a file found judgment is made, the SaaS server program 3400 acquires the results of executing the XaaS selection processing (see FIG. 25) in order to determine the next PaaS site 107 to which the request is to be sent (step 3803).

The SaaS server program 3400 judges whether or not there is an error, such as the results of the XaaS selection processing indicating that no subsequent candidate PaaS site 107 was found (step 3804). When an error is judged, the SaaS server program 3400 sends a request error response to the request-source SaaS site 114 (step 3805). When no error is judged, the SaaS server program 3400 executes the processing of step 3800.

Figure 39:
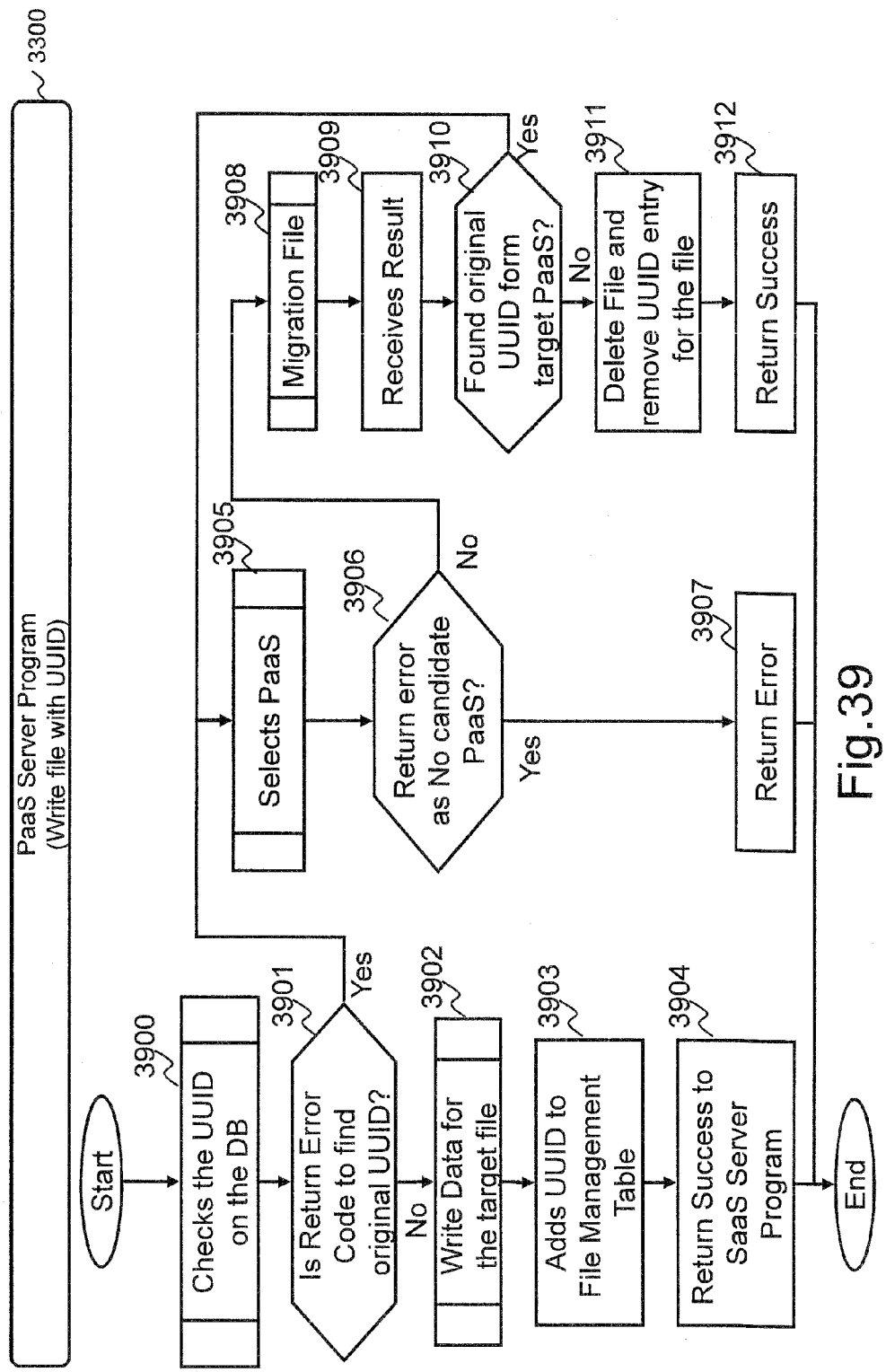
FIG. 39 is a flowchart of backup processing by a PaaS server program 3300, according to the second embodiment of the present invention.

FIG. 39 is a flowchart of the backup processing of the PaaS server program 3300.

This processing is executed when the PaaS server program 3300, having received a write request from the SaaS site 114, writes a file to the storage apparatus 223, and when the file monitoring program 3301 then detects a virtual machine file and acquires the original VM UUID.

The PaaS server program 3300 acquires the original VM UUID as a parameter from the file monitoring program 3301 at this time.

The PaaS server program 3300 acquires the results of executing the original VMUUID check processing (see FIG. 31) (step 3900). When the virtual machine file is saved in the storage apparatus 223, the acquired original VM UUID is registered in the extended UUID 1103 of the file management table 402. In step 3100 of the original VM UUID check processing, the PaaS server program 3300 compares the original VM UUID with the extended UUID 1103 of the file management table 402.

The PaaS server program 3300 judges, from the acquired results, whether or not a file with an extended UUID identical to the original VM UUID has been found (3901).

When a no file found judgment is made, the PaaS server program 3300 writes file data included in the write request, using the path name and file name included in the write request (step 3902). The PaaS server program 3300 registers the original VM UUID in the extended UUID 1103 of the file management table 402 (3903). The PaaS server program 3300 sends a success response to the request-source SaaS site 114 (step 3904).

When a file found judgment is made, the PaaS server program 3300 acquires the results of executing XaaS selection processing (see FIG. 25) in order to determine the next PaaS site 107 to which the write request is to be sent (step 3905). The PaaS server program 3300 judges whether or not there is an error, such as the results of the XaaS selection processing indicating that no subsequent candidate PaaS site 107 was found (step 3906).

When an error is judged, the PaaS server program 3300 sends a request error response to the write request-source PaaS site 107 (step 3907).

When no error is judged, the PaaS server program 3300 sends a backup file write request to the PaaS site 107 selected from one or more backup target candidate PaaS sites 107 managed by the PaaS management table 402 (step 3908). Even when file writing is in progress, because the error judgment results are obtained in the processing of step 3900, the determination of whether or not writing is complete for each file part is managed using a bitmap, for example. In so doing, in the processing of step 3908, the data written to the storage apparatus 223 is read from the storage apparatus 223, and data not yet written to the storage apparatus 223 is read from a buffer, for example, whereby file data can be sent to another PaaS site 107 without waiting for file writing to end. The PaaS server program 3300 receives a response from the PaaS site 107 (step 3909). The PaaS server program 3300 judges, from the received response, whether or not a file with an extended UUID identical to the original VM UUID has been found from the PaaS sites 107 managed by the PaaS sites 107 to which the request was sent (step 3910).

When a file found judgment is made, the PaaS server program 3300 executes the processing of step 3905. When a no file found judgment is made, the PaaS program 3300 executes the processing of step 3911. Since it is determined that the file has been saved to another PaaS site 107, the data of the virtual machine file is deleted from the storage apparatus 223 of the PaaS site 107 executing this processing, and registration information of the virtual machine file is deleted from the file management table 402 (step 3911). The PaaS server program 3300 sends a success response to the request, to the write request-source SaaS site 114 (step 3912).

As described hereinabove, for virtual machine file backup, by checking, during backup, that a file with an identical UUID in the virtual machine file has not been saved in the backup target PaaS site, only the internal data of the file data are used without using metadata of the file data, thereby making it possible to avoid storing the backup file in the same PaaS site 107 as the backup-source PaaS site 107 where the original file is present. Consequently, even when a disaster involving data loss occurs at one PaaS site 107, one of the original file and the backup file thereof still remains available.

When the second embodiment described above and one or more modifications of the second embodiment are considered, the computer system according to the second embodiment can be implemented as follows, for example.

In other words, the backup apparatus adds, to the backup data, backup identification information (extended UUID, for example), which is identification information including original data identification information (the UUID, for example) and an identifier of a logical volume serving as the backup data storage target, and sends a request to store the backup data to which the backup identification information was added. The storage request may be sent to the storage system via a relay apparatus such as a SaaS server, or may be sent to the storage system without passing via such a relay apparatus.

After receiving the request to store the backup data to which the backup identification information was added, the first storage system judges, in response to the received storage request, whether or not identification information, identical to the identification information included in the backup identification information added to the backup data, is being managed, and stores the backup data when the judgment result is negative.

In cases where the judgment result is positive, the first storage system or a relay apparatus for relaying the storage request selects a second storage system which belongs to an organization and/or location different from an organization and/or location to which the first storage system belongs, on the basis of organization/location information indicating the organizations and/or locations to which storage systems coupled to the first storage system or relay apparatus belong, and sends a storage request for backup data, to which backup identification information was added, to the second storage system. In other words, a storage request may be sent from the first storage system to the second storage system without passing via a relay apparatus such as a SaaS server, or the relay apparatus may send a storage request to the second storage system in cases where an error response is received from the first storage system.

Note that, after receiving the storage request, the second storage system may perform a judgment of whether identification information, identical to the identification information included in the backup identification information added to the backup data, is being managed in the same way as the first storage system.

Furthermore, the second storage system, to which the storage request is sent, may be a storage system that belongs to a location farthest from the location to which the first storage system belongs.

In addition, in cases where any storage system coupled to the first storage system or the relay apparatus is a storage system identical to that of an organization and/or location to which the first storage system belongs, the first storage system or relay apparatus, may, upon receiving a storage request, return an error to the backup apparatus. In this case, the backup apparatus may send the storage request to a storage system or relay apparatus different from the first storage system or relay apparatus.

Embodiment 3

In Embodiment 3, the SaaS server supplies information relating to the location and organization to which the SaaS vendor providing the SaaS server belongs to the user server via an API. Likewise, the PaaS server supplies information relating to the location and organization to which the PaaS vendor providing the PaaS server belongs to the user server via an API. The user server checks for an overlap between the backup source and backup target on the basis of the information relating to the locations and organizations. Consequently, the organization and location of the backup target can be made different from the organization and location of the backup source.

Differences from the second embodiment (and the first embodiment) will mainly be described hereinbelow, and points in common with the second embodiment (and the first embodiment) will be described simply or omitted.

In this embodiment, the backup program executed by the user server judges whether there is an overlap between the backup source and the backup target.

In Embodiment 3, the composition shown in FIG. 2 may also be adopted as a physical composition.

Figure 40:
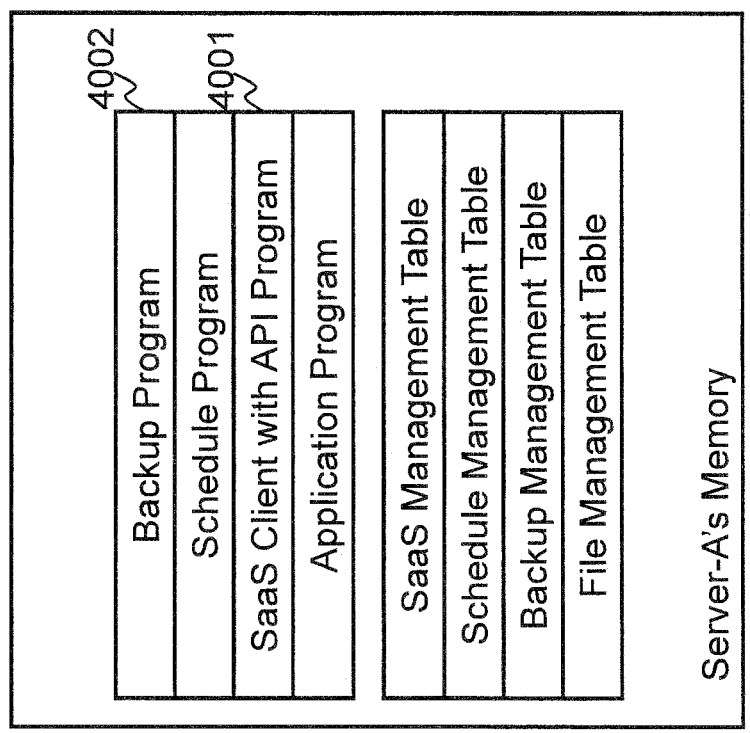
FIG. 40 is an explanatory diagram showing management information and programs in memory at a user site, according to a third embodiment of the present invention.

The programs and information shown in FIG. 40 are stored in the memory in the user server. A backup program 4002 judges whether or not there is an overlap between the backup source and the backup target. A SaaS client program 4001 performs access to an API.

In the memory (see FIG. 4) within the PaaS server, the PaaS server program 400 is a HTTP (Hypertext Transfer Protocol) or SOAP/REST (Simple Object Access Protocol/Representational State Transfer) program, or similar. The PaaS server program 400 has a function for reading the organization name 1000 and the storage location 1001 from the table 401 shown in FIG. 10, and responding via an API, for example.

In the memory (see FIG. 5) within the SaaS server, the SaaS server program 500 is an HTTP or SOAP/REST program or similar. The SaaS server program 500 has a function for reading the organization name 1400 and the storage location 1401 from the table 503 shown in FIG. 14, and responding via an API, for example.

Note that the following tables are used in embodiment 3: a SaaS management table (FIG. 6), a schedule management table (FIG. 7), a backup management table (FIG. 8), a file management table (the UUID (902) part is unused) (FIG. 9), an organization management table (FIG. 10), an PaaS-site file management table (the UUID (1102, 1103) parts are unused) (FIG. 11), a PaaS-site PaaS management table (FIG. 12), a SaaS-site PaaS management table (FIG. 13), a SaaS-site organization management table (FIG. 14), and a SaaS-site file management table (FIG. 15).

Figure 44:
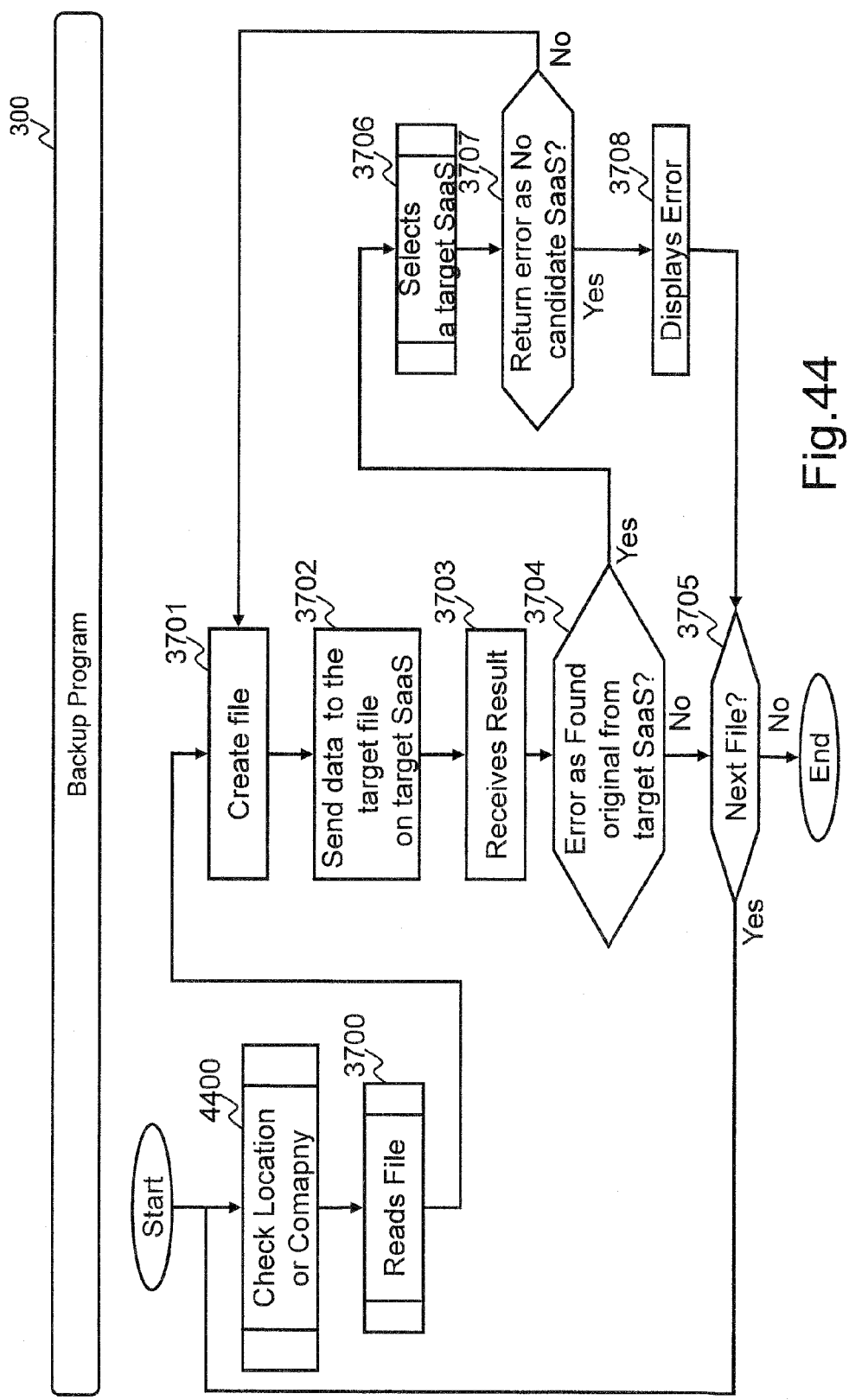
FIG. 44 is a flowchart of backup processing according to the third embodiment of the present invention.

The backup program 4002 performs backup processing in FIG. 44 on the basis of the backup schedule (see FIG. 7).

According to FIG. 44, organization/location check processing is performed before starting a backup (in other words, before starting the processing shown in FIG. 37) (step 4400 in FIG. 44). Note that, according to FIG. 37, when step 3705 yields YES, the processing returns to step 3700, whereas in this embodiment, according to FIG. 44, when step 3705 yields YES, the processing returns to step 4400.

The organization/location check processing of step 4400 is performed by the backup program 4002 (see FIG. 40).

Figure 41:
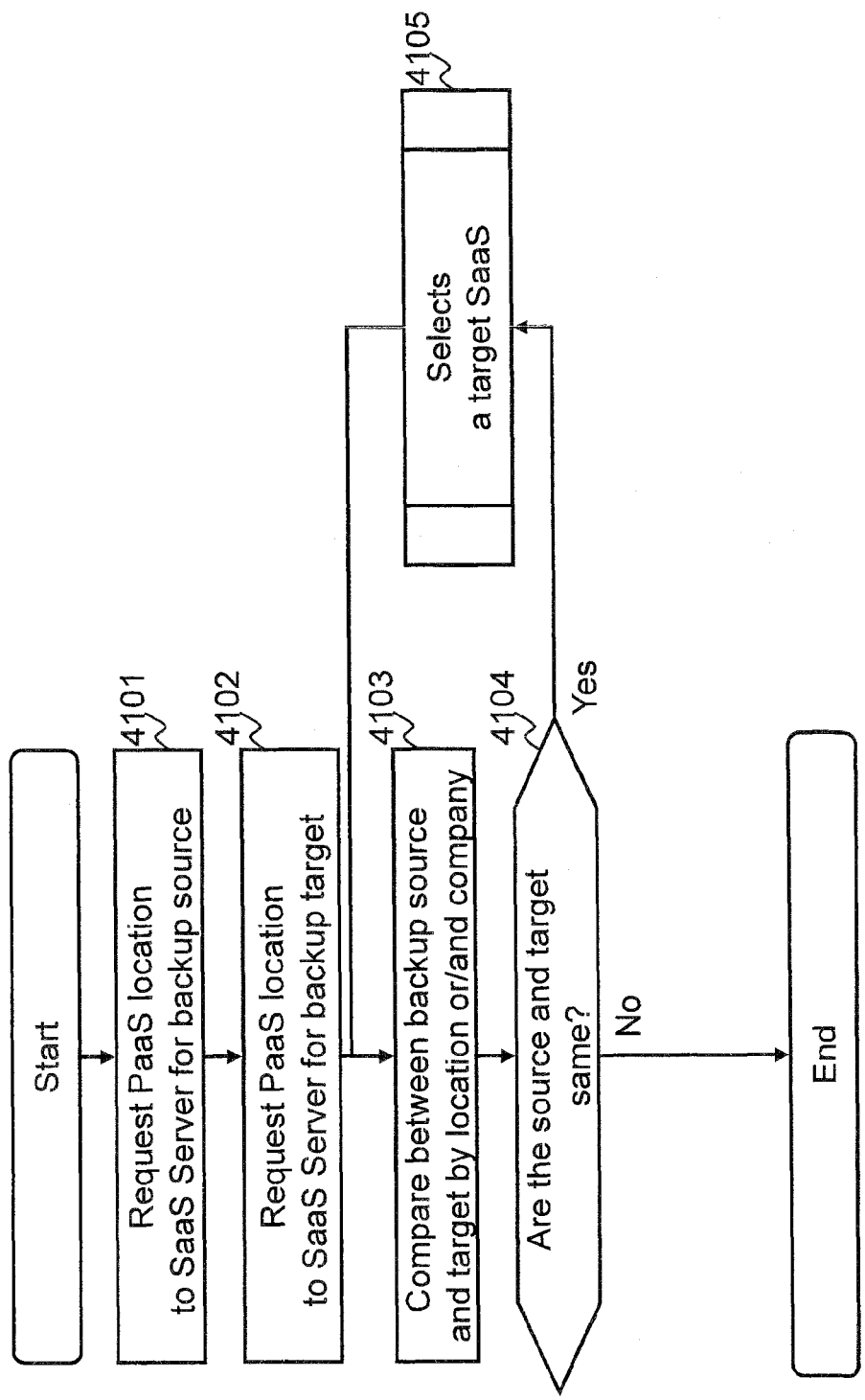
FIG. 41 is a flowchart of organization/location check processing of step 4400 in FIG. 44.

FIG. 41 is a flowchart of organization/location check processing of step 4400 in FIG. 44.

Figure 42:
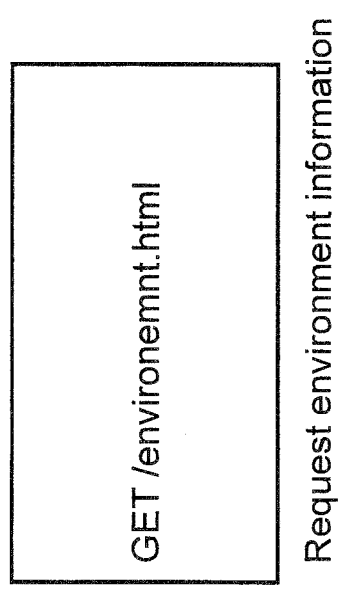
FIG. 42 shows an API used by a user server and a SaaS server, according to the third embodiment of the present invention.

(Step 4101) The backup program 4002 acquires, from the backup source file (original file), the SaaS ID 600 corresponding to the file name 901 (see FIG. 9) of the file. The backup program 4002 acquires the IP address 603 corresponding to the acquired SaaS ID 600 from a SaaS management table 304. The backup program 4002 uses an API to acquire information (organization name and storage location) relating to the PaaS site managed by the SaaS server, from the SaaS server, on the basis of the acquired IP address 603. Note that the PaaS server program 400 and the SaaS server program 500 each use an API when returning the organization name and the storage location information (location information). Examples of APIs in this embodiment are shown in FIGS. 42 and 43. These APIs perform access using the HTTP protocol, as illustrated earlier; in FIG. 42, a user server or SaaS server returns a return value including organization name and storage location information under a GET/environment.html instruction.

(Step 4102) The backup program 4002 acquires a SaaS ID 600 of the SaaS site 114 that is the default backup target of the backup target file. The backup program 4002 acquires the IP address 603 corresponding to the acquired SaaS ID 600 from the SaaS management table 304. The backup program 4002 acquires information (organization name and location information) relating to the PaaS site managed by the SaaS server from the SaaS server, using an API, on the basis of the acquired IP address 603. Note that the PaaS server program 400 and the SaaS server program 500 each use an API when returning organization name and storage location information (location information).

(Step 4103) Based on information acquired in steps 4101 and 4102, a backup program 4002 performs a comparison to determine whether there is a match between the organization and location to which the PaaS site storing the original file belongs, and the organization and location to which the PaaS site storing the backup file belongs (this judgment may also be performed for only the organization or the location). This comparison may be performed in order starting with the location farthest from the location to which the PaaS belongs and where the original file is stored. Thus, the farthest location is easily selected, resulting in a reduced likelihood of data loss caused by a large-scale disaster.

(Step 4104) The backup program 4002 judges whether a match is obtained from the results of the comparison in step 4103.

(Step 4105) When the result of the judgment of step 4104 is a 'match', the backup program 4002 selects a SaaS site different from the SaaS server (SaaS site) in step 4102 as the backup target (the detailed steps are shown in FIG. 25).

When the result of the judgment of step 4104 is 'no match', the backup program 4002 ends the processing.

After the organization/location check processing, the backup file is written. The backup file write target is the PaaS site (hereinafter called the 'target PaaS site' at this stage) acquired in step 4102, in cases where step 4104 yields 'no match'. A backup file write request is sent to the SaaS site in step 4102, and sent to the target PaaS site from the SaaS site.

When the third embodiment above and one or more modifications of the third embodiment are considered, the computer system according to the third embodiment can be implemented as follows, for example.

The backup apparatus acquires organization/location information indicating organizations and/or locations to which two or more storage systems, among a plurality of storage systems, belong. More specifically, for example, the backup apparatus sends an acquisition request for storage system-related organization/location information to all managed relay apparatuses (SaaS servers, for example). After receiving the acquisition request, the storage systems send storage system-related organization/location information (for example, organization name and/or storage location information) to the relay apparatus which sent the acquisition request. Furthermore, if a storage system manages another storage system, the former sends an acquisition request to the other storage system. Consequently, the storage system receives organization/location information relating to the other storage system from the other storage system (if a further storage system is coupled directly or indirectly to the other storage system, the other storage system receives organization/location information relating to the further storage system). The storage systems send the received organization/location information to the relay apparatus that sent the acquisition request. The relay apparatus sends the organization/location information received from the storage system to the backup apparatus. In this way, the backup apparatus is able to acquire organization/location information relating to all the storage systems.

Furthermore, on the basis of organization/location information for a plurality of storage systems, the backup apparatus specifies one or more second storage systems which belong to an organization and/or location different from the organization and/or location to which the storage system storing the original data belongs, and is able to display the specified one or more second storage systems as recommended backup-data storage targets. The backup apparatus is able to send a backup data storage request to a second storage system selected by the user from one or more second storage systems, or to a relay apparatus coupled to the selected second storage system.

Note that, among one or more second storage systems, a second storage system belonging to a location farthest from the location to which the first storage system belongs is most recommended.

Furthermore, the backup apparatus may perform organization/location information acquisition when performing a backup of the original data.

In addition, the backup apparatus may receive a storage system address (IP address, for example) from each relay apparatus instead of acquiring the organization/location information of the storage system from the relay apparatuses, and may acquire organization/location information directly from the storage systems using these addresses. An embodiment in which communication takes place via the SaaS site 114 has been described. However, if the PaaS management table 502 is managed by the user site 100, and the requests to the SaaS sites 114 and the processing by the SaaS sites is performed by the PaaS sites 107, a case where files are stored in the PaaS sites 107 directly without passing via the SaaS sites 114 can also be adopted. The storage system storing the original data may be in a local network to which the backup apparatus is coupled. In this case, values, configured by the administrator of the user site 100 using the backup program 4002 prior to backup processing, are employed for organization/location information of the storage system where the original data is stored.

Embodiment 4

A fourth embodiment of the present invention will be described hereinbelow. In so doing, differences from the first embodiment will mainly be described, and points in common with the first embodiment will be described simply or omitted.

The storage apparatus 223 of the PaaS site 107 may be NAS (Network Attached Storage), and have a RAIN (Redundant Array of Inexpensive Nodes) configuration.

Figure 1:
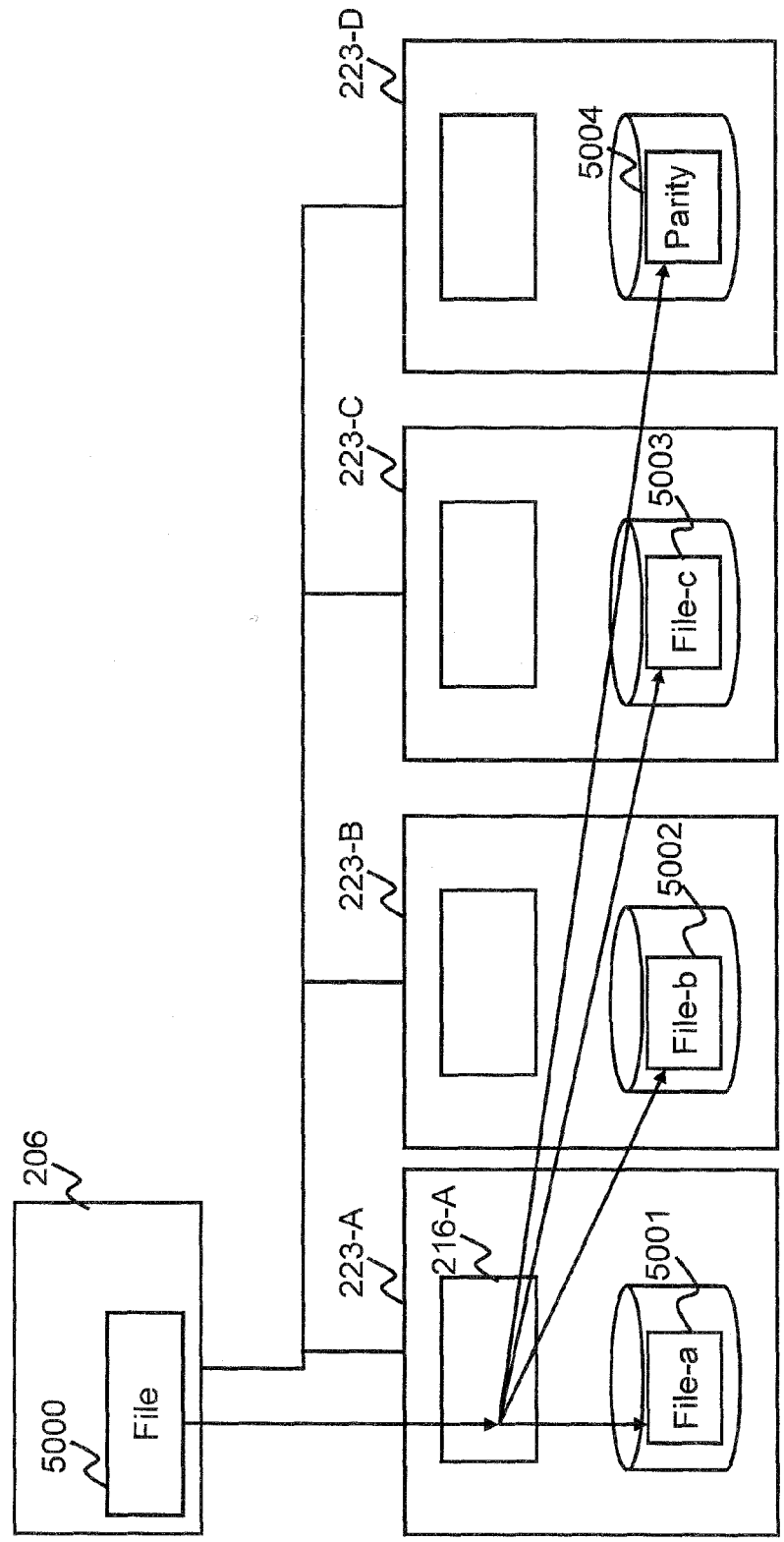
FIG. 1 shows an example of a RAIN (Redundant Array of Inexpensive Nodes) configuration according to a fourth embodiment of the present invention.

In this case, as shown in FIG. 1, a PaaS server 206 divides a write target file 5000 into chunks, namely, a file-a 5001, a file-b 5002, and a file-c 5003, and stores these chunks by distributing them between a plurality of storage apparatuses 223-A to 223-C. Here, the PaaS server 206 may generate parity data 5004 for file 5000 and store the parity data in a storage apparatus 223-D to enable recovery of the file 5000 even when one storage apparatus 223 stops operating due to damage. The number of divisions of the file 5000 in which the parity data 5004 is included may be equal to or less than the number of storage apparatus 223 constituting the RAIN. A case with fewer divisions will be described by way of example hereinafter. Note that fragments 5001 to 5003 of the file 5000 will be referred to hereinafter as 'file chunks', and that file chunks (file fragment data) and parity data will be referred to generally as 'subdata'.

Figure 46:
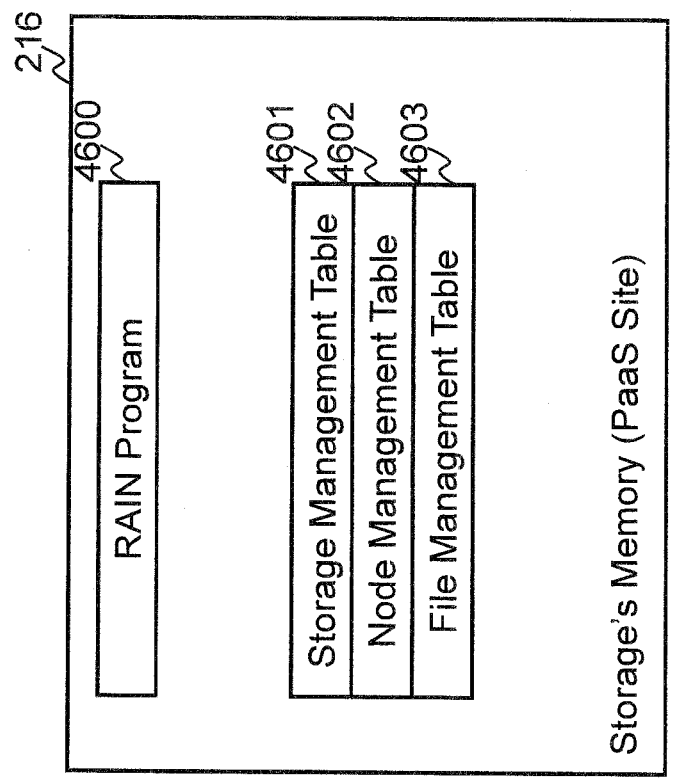
FIG. 46 shows an example of a program and information stored in a memory 216 of a RAIN-configuration storage apparatus 223, according to the fourth embodiment of the present invention.

FIG. 46 shows an example of programs and information that are stored in the memory 216 of the storage apparatus 223 in a RAIN configuration.

The memory 216 stores a RAIN program 4600, a storage management table 4601, a node management table 4602, and a file management table 4603. The RAID program 4600 performs file division, parity data generation, and file storage in the LU 218.

FIG. 47 shows an example of the storage management table 4601.

The storage management table 4601 is a table that has information relating to the storage apparatus 223, including the table 4601. The table 4601 includes, for example, a storage ID 4700, an IP address 4701, and a storage location 4702.

The storage ID 4700 is an ID for identifying the storage apparatus 223.

The IP address 4701 is an IP address used to communicate with the storage apparatus 223 in order to store data.

The storage location 4702 is information indicating the location where the storage apparatus is installed. The value of the storage location 4702 may be the name of a country or continent, for example.

FIG. 48 shows an example of the node management table 4602.

The node management table 4602 includes a storage ID 4800, an IP address 4801, and a storage location 4802, for each storage apparatus (node) capable of communicating with the storage apparatus 223 holding the table 4602. The storage ID 4800 corresponds to the storage ID 4700 of the storage apparatus 223. The IP address 4801 corresponds to the IP address 4701 of the storage apparatus. The storage location 4802 corresponds to the storage location 4702 of the storage apparatus.

The node management table 4602 is created when the PaaS administrator registers a storage apparatus that is to serve as a component in the RAIN configuration.

FIG. 49 shows an example of the file management table 4603.

The file management table 4603 includes, for each subdata item, a local ID 4900, a chunk ID 4901, a path name 4902, a file name 4903, a storage ID 4904, a type 4905, a UUID 4906, and an extended UUID 4907.

The local ID 4900 is an ID for identifying a file serving as a subdata source.

The chunk ID 4901 is an ID for identifying subdata.

The path name 4902 is the path name of the file that is the subdata source.

The file name 4903 is the file name of the file that is the subdata source.

The storage ID 4904 is corresponds to the storage ID 4700 of the storage apparatus where the subdata is stored.

The type 4905 is information for identifying whether the subdata is a file chunk or parity data. A file chunk is registered as 'data', while parity data is registered as 'parity'.

The UUID 4906 is an ID similar to the UUID 1102, the same UUID being registered for the same file name 4903.

The extended UUID 4907 is an ID similar to the extended UUID 1103, the same extended UUID being registered for the same file name 4903.

The file management table 4603 is created by the RAIN program 4600 when a file is stored.

In this embodiment, when the storage apparatus has a NAS RAIN configuration, the RAIN program 4600 is able to perform the processing of the PaaS server program 400. In cases where a file is stored discretely between storage apparatuses, the RAIN program 4600 stores the file chunks and parity data so that the storage IDs 4700 of the storage apparatuses 223 storing these data are all different. When a backup file has a UUID identical to the UUID 4906 of the original file, in an extended UUID 4907, the RAIN program 4600 stores the file chunks and parity data of the backup file so that the storage ID 4700 of the storage apparatus 223 storing this data, and the storage ID 4700 of the storage apparatus storing the file chunks and parity data of the original file are completely different. Thus, one of the original file and the backup file can be preserved even when data are lost at the same time, due to damage, from two storage apparatuses constituting the RAIN.

Note that the RAIN program 4600 may also store file chunks and parity data of the backup file so that, instead of the storage ID 4700, the storage location 4802 corresponding to the file chunks and file data of the backup file is completely different from the storage location 4802 corresponding to the file chunks and parity data of the original file. Thus, one of the original file and the backup file can be preserved even when data are lost at the same time, due to a large-scale disaster, from two storage apparatuses that constitute the RAIN and belong to the same location.

As a storage apparatus for storing backup subdata (file chunks and parity data of the backup file) corresponding to the original subdata (file chunks and parity data of the original file), a storage apparatus which belongs to a storage location 4802 farthest from the storage location 4802 of the storage system storing the original subdata may be selected. Consequently, there is an increased likelihood of preserving one of the original file and the backup file even if a region-wide large-scale disaster should occur.

Depending on the RAID level of the RAIN configuration, for N (where N is an integral number) storage apparatuses, the storage ID 4700 and the storage location 4802 of the storage apparatus 223 storing the original subdata, and the storage ID 4700 and the storage location 4802 of the storage apparatus 223 storing the backup subdata may be identical. For example, depending on the RAID level, a file can be recovered even when one or more storage apparatuses are damaged, where N is the maximum number of storage apparatuses in which damage may occur. More specifically, when the RAID level is RAID5, N=1, and when the RAID level is RAID6, N=2, for example.

In cases where the RAIN program 4600 carries out the processing in FIG. 31, an error is not returned when an identical UUID exists, but an error is returned when it is not possible to make the storage ID of the subdata of the original file completely different from the storage ID of the subdata of the backup file, or when it is not possible to make all the storage location information (location information) different.

The fourth embodiment may also be combined with any of the first to third embodiments.

The user server or SaaS server may also store a plurality of subdata, based on an original file, and a plurality of subdata, based on a backup file, such that the subdata are distributed between a plurality of storage systems at a plurality of PaaS sites. In this case, a predetermined number of second storage systems (N second storage systems corresponding to the RAID level of the RAIN configuration, for example), among a plurality of second storage systems where a plurality of subdata based on the backup file are stored, are storage systems belonging to organizations and/or locations different from organizations and/or locations to which a plurality of first storage systems, storing a plurality of subdata based on the original file, respectively belong.

Embodiment 5

A fifth embodiment of the present invention will be described hereinbelow. In so doing, differences from the first embodiment will mainly be described, and points in common with the first embodiment will be described simply or omitted.

Figure 50:
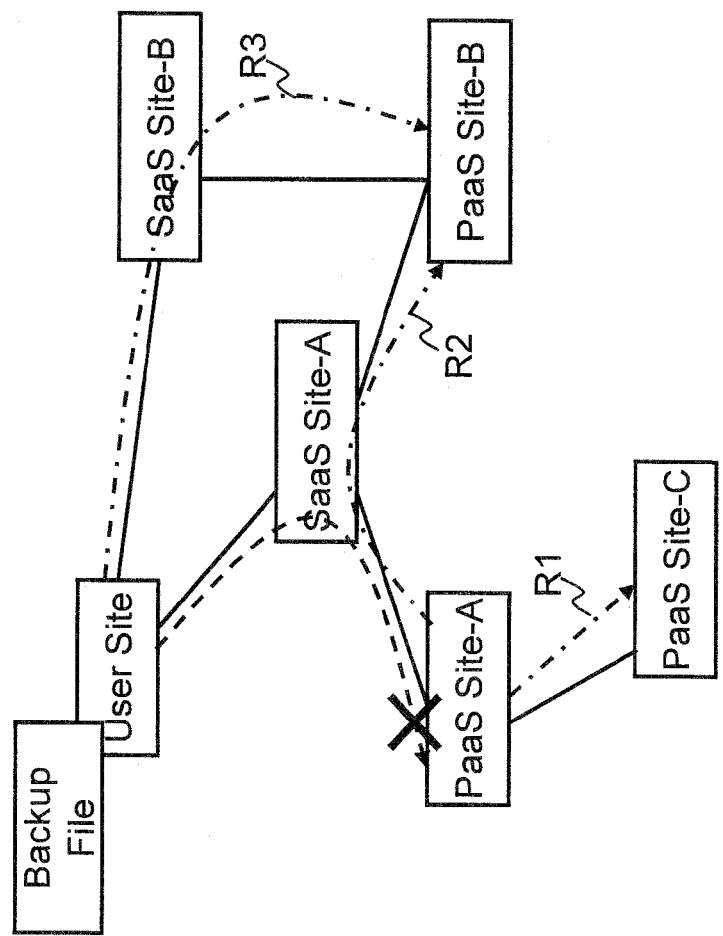
FIG. 50 is an explanatory diagram of the ranking order of backup file storage routes, according to a fifth embodiment of the present invention.

FIG. 50 is an explanatory diagram of the ranking order of backup file storage routes, according to the fifth embodiment of the present invention.

Suppose that a user site, PaaS site-A, PaaS site-B, PaaS site-C, SaaS site-A, and SaaS site-B exist, for example. The user server in the user site is coupled to a SaaS server A in the SaaS site-A, and to a SaaS server B in the SaaS site-B. The SaaS server A is coupled to a PaaS server A in the PaaS site-A, and to a PaaS server B in the PaaS site-B. The PaaS server A is coupled to a PaaS server C in the PaaS site-C. The SaaS server B is coupled to the PaaS server B.

In this configuration, suppose that the PaaS site-A has been unable to store a backup file sent to the PaaS site-A. In this case, the routes that may be selected as the route for storing the backup file are as follows, starting with the highest ranking route first:

(R1) Route from PaaS site-A to PaaS site-C;
(R2) Route from PaaS site-A to PaaS site-B via SaaS site-A; and
(R3) Route from user site to PaaS site-B via SaaS site-B.

In other words, the smaller the number of hops (number of communications) a route has, the higher its ranking. That is, route R1 is a route via which communication is performed from PaaS site-A to PaaS site-C (backup file transfer, for example), in other words, a route for which the number of hops is '1'. Route R2 is a route via which communication is performed from PaaS site-A to SaaS site-A, and from SaaS site-A to PaaS site-B, in other words, a route for which the number of hops is '2'. Route R3 is a route via which communication is performed from PaaS site-A to the user site, from the user site to SaaS site-B, and from SaaS site-B to PaaS site-B, in other words, a route for which the number of hops is '3'. Hence, R1 has the highest ranking, while R3 has the lowest ranking. Therefore, in concrete terms, when the present embodiment is applied to the first and second embodiments, for example, the PaaS server A is configured to transfer a backup file via route R1. When the backup file cannot be stored via route R1 (when the PaaS server C is damaged, for example), the PaaS server A stores the backup file via route R2. When the backup file cannot be stored via route R2 either (when the PaaS server C is damaged, for example), the PaaS server A sends an error response. The error response is received by the user site via the SaaS server A. Upon receiving this error response, the backup program executed by the user server stores the backup file via route R3.

Furthermore, when the present embodiment is applied to the third embodiment, for example, the backup program executed by the user server may display recommended storage targets in accordance with the aforementioned ranking order.

Several embodiments of the present invention have been described hereinabove, but the present invention is not limited to these embodiments. It is understood that a variety of modifications are possible within a scope not departing from the spirit of the present invention.

For example, the SaaS site 114 need not feature in any of the above embodiments. In other words, a file may be stored in the PaaS site 107 from the user site 100 without passing via the SaaS site 114. In this case, the PaaS client program 501 and the PaaS management table 502 may be stored in the memory 203 in the user server 200.

Moreover, the functions of the PaaS server may also be incorporated in the storage controller.

In addition, two or more of the first to fifth embodiments may be combined. At least one of the following combinations (0) to (P) may be adopted, for example:
(O) a combination of the first embodiment and the fourth and/or fifth embodiments;
(P) a combination of the second embodiment and the fourth and/or fifth embodiments; and
(Q) a combination of the third embodiment and the fourth and/or fifth embodiments.

REFERENCE SIGNS LIST

107: PaaS site

The invention claimed is:
1. A computer system, comprising:
a backup apparatus coupled to a wide area network;
a plurality of storage systems including a storage system coupled to the wide area network,
wherein one of the backup apparatus and the storage system performs control to store backup data in a storage system which belongs to an organization and/or location different from an organization and/or location to which a storage-target storage system for original data belongs, based on information (P) and/or (Q) below:
(P) information relating to original data, and information relating to the backup data, which is a copy of the original data;
(Q) information indicating an organization and/or location to which each storage system belongs:
a plurality of SaaS (Software as a Service) servers which are servers provided by a SaaS vendor,
wherein the SaaS servers are each coupled to at least one of the backup apparatus and one or more other SaaS servers,
wherein two or more SaaS servers of the plurality of SaaS servers are coupled to the backup apparatus,
wherein the plurality of storage systems are systems provided by a plurality of PaaS (Platform as a Service) vendors,
wherein the storage systems are each coupled to at least one of one or more SaaS servers and one or more other storage systems,
wherein two or more storage systems among the plurality of storage systems are coupled to the plurality of SaaS servers,
wherein the storage systems are each configured to execute:
(a) management of a Universally Unique Identifier (UUID) of a stored file;
(b) in response to a file storage request, a determination of whether a backup identifier is included in the UUID of the file;
(c) when a determination is made that the backup identifier is included, a determination of whether a UUID identical to the UUID in the UUID of the file is managed;
(d) when a determination is made that the identical UUID is managed, transmission of an error response to a transmission source of the storage request; and
(e) when a determination is made that an identical UUID is not managed, storage of the file,
(A) wherein the backup apparatus adds, to a backup file which is a copy of an original file, a backup UUID, which is a UUID including a UUID of the original file and a backup identifier, and sends a request to store the backup file, to which the backup UUID has been added, to a first SaaS server from among two or more SaaS servers coupled to the backup apparatus,
(B) wherein, in response to the received storage request, the first SaaS server sends a request to store the backup file to which the backup UUID has been added, to a first storage system coupled to the first SaaS server,
(C) wherein, in response to the received storage request, when a determination is made that a backup identifier is included in the backup UUID added to the backup file, the first storage system judges whether a UUID identical to the UUID included in the backup UUID is being managed,
(D) wherein, when the result of the determination in (C) is affirmative, the first storage system returns an error response to the first SaaS server,
(E) wherein, when the result of the determination in the (C) is negative, the first storage system stores the backup file,
(F) wherein, when an error is received from the first storage system, the first SaaS server sends a request to store the backup file to which the backup UUID has been added to the second storage system coupled to the first SaaS server,
wherein the information relating to the original data is the UUID of the original file, and
wherein the information relating to the backup data is the backup UUID of the backup file.
2. A computer system, comprising:
a backup apparatus coupled to a wide area network;
a plurality of storage systems including a storage system coupled to the wide area network,
wherein one of the backup apparatus and the storage system performs control to store backup data in a storage system which belongs to an organization and/or location different from an organization and/or location to which a storage-target storage system for original data belongs, based on information (P) and/or (Q) below:
(P) information relating to original data, and information relating to the backup data, which is a copy of the original data;
(Q) information indicating an organization and/or location to which each storage system belongs:
a plurality of SaaS (Software as a Service) servers which are servers provided by a SaaS vendor,
wherein the SaaS servers are each coupled to at least one of the backup apparatus and one or more other SaaS servers,
wherein two or more SaaS servers of the plurality of SaaS servers are coupled to the backup apparatus,
wherein the plurality of storage systems are systems provided by a plurality of PaaS (Platform as a Service) vendors,
wherein the storage systems are each coupled to at least one of one or more SaaS servers and one or more other storage systems,
wherein two or more storage systems among the plurality of storage systems are coupled to the plurality of SaaS servers,
wherein the storage systems are each configured to execute:
(a) management of a Universally Unique Identifier (UUID) of a stored virtual machine file;
(b) in response to a file storage request, a determination of whether a UUID identical to the UUID of the file is managed;
(c) when a determination is made that an identical UUID is managed, transmission of an error response to a transmission source of the storage request; and
(d) when a determination is not made that an identical UUID is not managed, storage of the file,
wherein the UUID of the virtual machine file includes an identifier of a logical volume in which a virtual machine is stored,
(A) wherein the backup apparatus adds, to a backup file which is a copy of an original virtual machine file, a backup UUID, which is a UUID including a UUID of the original virtual machine file and an identifier of a logical volume serving as the backup file storage target, and sends a request to store the backup file, to which the backup UUID has been added, to a first SaaS server among two or more SaaS servers coupled to the backup apparatus,
(B) wherein, in response to the received storage request, the first SaaS server sends a request to store the backup file to which the backup UUID has been added, to a first storage system coupled to the first SaaS server,
(C) wherein, in response to the received storage request, the first storage system judges whether a UUID identical to the UUID included in the backup UUID which has been added to the backup file is managed,
(D) wherein, when the result of the determination in (C) is affirmative, the first storage system returns an error response to the first SaaS server,
(E) wherein, when the result of the determination in (C) is negative, the first storage system stores the backup file,
(F) wherein, when an error is received from the first storage system, the first SaaS server sends a request to store the backup file, to which the backup UUID has been added, to the second storage system coupled to the first SaaS server,
wherein the information relating to the original data is the UUID of the original file, and
wherein the information relating to the backup data is the backup UUID of the backup file.

* * * * *